US012771184B2

(12) United States Patent
Heikkilä et al.

(10) Patent No.: US 12,771,184 B2
(45) Date of Patent: Oct. 20, 2026

(54) METHODS, SYSTEMS, AND APPARATUSES FOR CHARGING WEARABLE DEVICES

(71) Applicant: NaturalCycles Nordic AB, Stockholm (SE)

(72) Inventors: Mikael Heikkilä, Oulu (FI); Markku Kallunki, Stockholm (SE); Hannu Holck, Stockholm (SE); Hannu Lapinkangas, Stockholm (SE); Hannu Tiainen, Oulu (FI); Manuel Jose Aberg Cobo, Stockholm (SE)

(73) Assignee: NaturalCycles Nordic AB, Stockholm (SE)

( * ) Notice: Subject to any disclaimer, the term of this patent is extended or adjusted under 35 U.S.C. 154(b) by 0 days.

(21) Appl. No.: 19/386,402

(22) Filed: Nov. 12, 2025

(65) Prior Publication Data

US 2026/0246312 A1 Aug. 20, 2026

Related U.S. Application Data

(63) Continuation of application No. 19/375,950, filed on Oct. 31, 2025.

(Continued)

(51) Int. Cl.
*H01M 10/46* (2006.01)
*H02J 50/00* (2016.01)

(Continued)

(52) U.S. Cl.
CPC ............ *H02J 50/90* (2016.02); *H02J 50/005* (2020.01); *H02J 50/10* (2016.02)

(58) Field of Classification Search
CPC .......... H02J 50/90; H02J 50/005; H02J 50/10; H02J 7/70

(Continued)

(56) References Cited

U.S. PATENT DOCUMENTS

| | | | |
|---|---|---|---|
| 9,958,904 B2 | 5/2018 | Von Badinski et al. | |
| 9,997,945 B2 | 6/2018 | Kallunki et al. | |

(Continued)

FOREIGN PATENT DOCUMENTS

| | | | |
|---|---|---|---|
| CN | 115514113 A * | 12/2022 | ............. H02J 50/90 |
| CN | 221653773 U | 9/2024 | |

OTHER PUBLICATIONS

U.S. Appl. No. 19/375,950, filed Oct. 31, 2025; Inventor Heikkila, Mikael et al.

(Continued)

*Primary Examiner* — Edward Tso
(74) *Attorney, Agent, or Firm* — COOLEY LLP

(57) ABSTRACT

Methods, systems, and apparatuses for charging wearable devices are described herein. In some embodiments, an apparatus comprises a housing, a first inductive charging element, and an alignment element. The housing includes a concave wall that is configured to receive and contact an outer side of a ring-shaped device without covering or obscuring an inner side of the ring-shaped device. The first inductive charging element is disposed in the housing adjacent to the concave wall. The alignment element is disposed in the housing. The alignment element is configured to cause a second inductive charging element disposed in the ring-shaped device to align with the first inductive charging element such that the first and second inductive charging elements can charge a power source disposed in the ring-shaped device.

20 Claims, 16 Drawing Sheets

Related U.S. Application Data

(60) Provisional application No. 63/761,084, filed on Feb. 20, 2025.

(51) Int. Cl.
*H02J 50/10* (2016.01)
*H02J 50/90* (2016.01)

(58) Field of Classification Search
USPC ................................ 320/107, 108, 114, 115
See application file for complete search history.

(56) References Cited

U.S. PATENT DOCUMENTS

| | | | | |
|---|---|---|---|---|
| 10,496,131 | B2 | 12/2019 | Von Badinski et al. | |
| 11,075,538 | B2 | 7/2021 | Vallius et al. | |
| 11,742,678 | B2 | 8/2023 | Vallius et al. | |
| 12,100,965 | B2 * | 9/2024 | Haverinen ............ | H02J 50/005 |
| 2018/0248406 | A1 | 8/2018 | Bae et al. | |
| 2019/0252901 | A1 | 8/2019 | Lin et al. | |
| 2021/0351622 | A1 * | 11/2021 | Järvelä ...................... | H02J 7/80 |
| 2023/0105636 | A1 | 4/2023 | Haverinen et al. | |
| 2024/0008205 | A1 | 1/2024 | Doval et al. | |
| 2024/0266852 | A1 | 8/2024 | Uusitalo et al. | |
| 2024/0396371 | A1 | 11/2024 | Haverinen et al. | |
| 2025/0055293 | A1 | 2/2025 | Hwang | |
| 2025/0055294 | A1 | 2/2025 | Kelloniemi | |
| 2025/0107753 | A1 | 4/2025 | Sippola et al. | |
| 2025/0112496 | A1 | 4/2025 | Sippola | |
| 2025/0112498 | A1 | 4/2025 | Saikkonen et al. | |
| 2025/0167601 | A1 | 5/2025 | Saikkonen | |
| 2025/0209145 | A1 | 6/2025 | Makinen | |
| 2025/0210186 | A1 | 6/2025 | Makinen | |
| 2025/0233454 | A1 * | 7/2025 | Ahmed ..................... | H02J 7/82 |
| 2025/0233455 | A1 | 7/2025 | Ahmed et al. | |
| 2025/0260249 | A1 | 8/2025 | Saikkonen | |
| 2025/0273992 | A1 | 8/2025 | Sippola | |
| 2025/0273995 | A1 | 8/2025 | Ratner et al. | |
| 2025/0337280 | A1 | 10/2025 | Kuonanoja | |

OTHER PUBLICATIONS

PCT Application No. PCT/EP2026/054752, International Search Report and Written Opinion mailed May 28, 2026; Natural Cycles Nordic AB; 20 pages.

U.S. Appl. No. 19/375,950, Non-Final Office Action mailed Mar. 16, 2026; Inventor Heikkila, Mikael et al.; 18 pages.

* cited by examiner

METHODS, SYSTEMS, AND APPARATUSES FOR CHARGING WEARABLE DEVICES

CROSS REFERENCE TO RELATED APPLICATIONS

This application is a continuation of U.S. patent application Ser. No. 19/375,950, filed Oct. 31, 2025, and titled "METHODS, SYSTEMS, AND APPARATUSES FOR CHARGING WEARABLE DEVICES," which claims priority to U.S. Provisional Patent Application No. 63/761,084, filed Feb. 20, 2025, and titled "METHODS, SYSTEMS, AND APPARATUSES FOR CHARGING WEARABLE DEVICES," the contents of each of which are incorporated by reference herein in their entirety.

TECHNICAL FIELD

The embodiments described herein relate generally to wearable devices, and in particular to methods, systems, and apparatuses for charging wearable devices.

BACKGROUND

Wearable devices are often worn to quickly and effectively indicate health information, such as physiological data, to users. The appearance or aesthetic of wearable devices enhances the user experience of wearable technology. A wearable device will often mask electronics with an outer coating or outer housing, thus presenting a sleek design. For example, a wearable ring may have a metallic coating that conceals the technological nature of the device. However, maintaining the aesthetics of the wearable device becomes challenging when the device needs to be regularly charged. A wearable device with a charging port or charging cable protruding from the wearable device sacrifices aesthetics. Some existing charging systems include disposing charging coils within an interior of a wearable device. This enables such a device to recharge upon proximity to and/or contact with a corresponding charging coil on a charging device. However, poor or improper alignment between charging coils on the wearable device and charging coils on the charging device can limit or prevent effective charging of the wearable device.

Typically, wearable devices are worn throughout the day and/or night to continuously gather data, such as activity data, heart rate data, sleep data, etc., from users. As such, wearable devices need to be regularly charged and recharged. Thus, there is a need to develop devices and methods that align wearable devices with corresponding charging devices to effectively charge wearable devices.

SUMMARY

Methods, systems, and apparatuses for charging wearable devices are described herein. In some embodiments, an apparatus comprises a housing, a first inductive charging element, and an alignment element. The housing includes a concave wall that is configured to receive and contact an outer side of a ring-shaped device without covering or obscuring an inner side of the ring-shaped device. The first inductive charging element is disposed in the housing adjacent to the concave wall. The alignment element is disposed in the housing. The alignment element is configured to cause a second inductive charging element disposed in the ring-shaped device to align with the first inductive charging element such that the first and second inductive charging elements can charge a power source disposed in the ring-shaped device.

In some embodiments, an apparatus comprises a concave wall, a platform, a first inductive charging element, and an alignment element. The concave wall is configured to receive and contact an outer side of a ring-shaped device. The platform is coupled to the concave wall. The platform includes an inclined surface configured to support the ring-shaped device thereon such that the ring-shaped device is gravitationally driven toward the concave wall. The first inductive charging element is disposed in the concave wall. The alignment element is disposed in the concave wall. The alignment element is configured to cause a second inductive charging element disposed in the ring-shaped device to align with the first inductive charging element such that the first and second inductive charging elements can charge a power source disposed in the ring-shaped device.

DETAILED DESCRIPTION

The embodiments described herein relate generally to wearable devices, and in particular to methods and apparatus for charging wearable devices. Systems and device described herein can include a charging device configured to align a wearable device with corresponding charging coils, e.g., for effective charging. In some embodiments, systems, devices, and methods described herein can be used with ring-shaped wearable devices configured to measure physiological data associated with a user. In some embodiments, systems, devices, and methods described herein can be used with ring-shaped wearable devices configured to provide the physiological data to the user. Alternatively, systems, devices, and methods described herein can be adapted for use with other types of wearable devices, e.g., wrist-worn wearable devices, head-worn wearable devices, clip-on devices, patches or skin-worn wearable devices, etc. Moreover, systems, devices, and methods described herein can be used with a wearable device of any size (e.g., wearable ring-shaped devices having sizes in a range from US3-US16) or shape. The systems and devices described herein may be designed to provide charging functionality via proximity and/or contact with wearable devices disclosed herein. As such, systems and devices avoid requiring ports or other components to be installed on wearable devices, thereby maintaining their aesthetics. In some embodiments, systems and devices described herein enable ergonomic placement and/or retrieval of a wearable device. For example, systems and devices described herein can provide a surface, region, or area on or in which a wearable device may be placed or disposed, instead of requiring a user to locate or open a charging port and connect a charging cable to the wearable device. Further, systems and devices described herein can enable a user to quickly and easily pick up or remove the wearable device from the charging system (e.g., with one hand, with an index finger and a thumb, one fingertip, etc.), rather than requiring a user to manually decouple (e.g., unhook, detach, pull out, etc.) the wearable device from other conventional charging systems. However, systems and devices described herein secure wearable devices within and/or to disclosed charging systems to limit or prevent wearable devices from haphazardly and/or unintentionally decoupling from the charging systems. In some embodiments, systems and devices described herein include and/or define alignment elements that maneuver, adjust, align, etc., a wearable device with charging coils for effective charging thereof, regardless of an initial positioning (e.g., user placement) of the wearable device relative to the charging coils. Therefore, systems and devices described herein align wearable devices with corresponding charging devices to effectively charge wearable devices.

Figure 1:
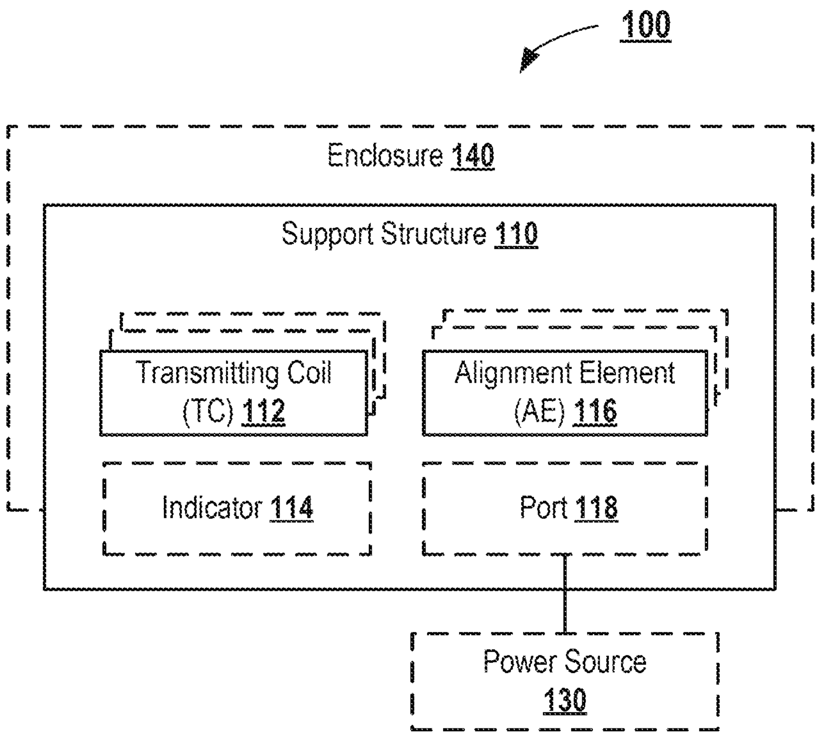
FIG. 1 is a schematic illustration of a charging device for charging a wearable device, according to an embodiment.

FIG. 1 shows a schematic illustration of a charging device 100 for charging a wearable device, according to an embodiment. Generally, the charging device 100 may include a support structure 110. Optionally, the charging device 100 can include an enclosure 140. The support structure 110 includes a transmitting coil (TC) 112 and an alignment element (AE) 116. Optionally, the support structure 110 includes an indicator 114 and a port 118. Although shown as having one TC 112, one AE 116, one port 118, and one indicator 114, the support structure 110 can have any number of TCs 112, AEs 116, ports 118, and/or indicators 114.

The support structure 110 can be any suitable structure configured to receive and/or interface with a wearable device. In some embodiments, the support structure 110 can be configured to hold, support, engage, and/or otherwise receive the wearable device. In some embodiments, the support structure 110 can include multiple portions (e.g., walls, surfaces, housings, platforms, etc.) that can be coupled and/or assembled together to form one or more structures for supporting the wearable device. That is, in some embodiments, the support structure 110 can be separable into modular components and coupled together. Alternatively, in other embodiments, the support structure 110 can be made of a monolithic or unitary structure. In some embodiments, the support structure 110 provides a platform configured to receive and/or support to the wearable device. In some embodiments, the support structure 110 can be configured to contact at least a portion of the wearable device. For example, the support structure 110 can contact one or more sides, surfaces, regions, parts, etc., of the wearable device. In some embodiments, the support structure 110 is configured to contact at least one portion (e.g., side, surface, region, etc.) of the wearable device, while not contacting at least one other portion of the wearable device. In such embodiments, the other portion of the wearable device can remain free, exposed, and/or otherwise accessible by a user while the wearable device is being charged by the charging device 100. For example, if the wearable device is a ring-shaped device, then the support structure 110 can be configured to support and/or contact the ring-shaped device along a bottom side and/or the outer side of the ring-shaped device without covering or obscuring an upper side and/or an inner side of the ring-shaped device. Optionally, the support structure 110 can enclose (e.g., fully encircle) an outer surface of the wearable device such that an outer surface of the support structure 110 contacts the outer surface of the wearable device. In some embodiments, the support structure 110 includes components, surfaces, walls, etc., that extend in different directions relative to the wearable device when the wearable device is in contact with or positioned on the support structure 110. For example, the support structure 110 can include a first surface that extends along a bottom side of the wearable device and a second surface that extends upwards along the outer surface of the wearable device.

In some embodiments, the support structure 110 can be configured to be disposed adjacent to the wearable device (e.g., along a side of the wearable device) to charge the wearable device. For example, the support structure 110 is configured to rest on a flat surface such that the wearable device can rest on or be supported by the flat surface next to (e.g., adjacent to). In such embodiments, the support structure 110 and the wearable device can be brought into contact with one another (e.g., by a user placing them adjacent to one another) to facilitate charging.

In some embodiments, the support structure 110 can be shaped or configured to support or hold the wearable device, e.g., such that the wearable device can rest on, lean on, or be otherwise held by the support structure 110. In some embodiments, the support structure 110 can have a flat surface that is configured to hold or support the wearable device. For example, the support structure 110 includes a platform, base, foundation, etc., configured to receive and hold the wearable device in place. In some embodiments, the platform, base, foundation, etc., of the support structure 110 is configured to be disposed and/or rest on a flat surface. In some embodiments, the support structure 110 is configured to receive and surround (e.g., nest with) at least a portion of the wearable device. For example, the support structure 110 may be shaped and/or sized to match or correspond to (or generally match or correspond to) a shape of the wearable device, e.g., to facilitate nesting therebetween. In some embodiments, if the wearable device includes a curved (e.g., convex or concave) surface(s), then the support structure 110 may include a corresponding curved surface(s) such that contact between the curved surfaces enables the wearable device to nest with the support structure 110 and/or the support structure 110 to nest with the wearable device. In some embodiments, the support structure 110 is about the same weight as the wearable device (e.g., within about 0.1 kilograms (kgs) of the weight of the wearable device). In some embodiments, the support structure 110 is about the same size as the wearable device (e.g., within about 5 millimeters (mms) of the wearable device). In other embodiments, the support structure 110 can be a different weight (e.g., heavier, lighter, etc.) than the wearable device, and/or can be a different size (e.g., smaller, larger, shorter, longer, etc.) than the wearable device.

In some embodiments, the support structure 110 may include inclinations, guides, or other components that preferentially drive or direct the wearable device toward or to one or more positions. For example, the support structure 110 may include a magnet that is configured to couple to another magnet or a metallic component of the wearable device, e.g., to cause the wearable device to couple or attach to the support structure 110 at a particular position. Additionally or alternatively, the support structure 110 may have a sloped surface, an inclined surface, a guide railing, rollers, or another suitable feature that causes the wearable device to be gravitationally driven toward or otherwise be drawn to a particular position along the support structure 110.

As noted above, the charging device 100 can include a TC 112, which can be a coil, wire, or other inductive charging element configured to charge the wearable device. The TC 112 can interface with at least one corresponding receiving coil (RC) on the wearable device to facilitate wireless charging of an onboard power source (e.g., battery) of the wearable device. For example, the TC 112 can be driven by a current to generate an electromagnetic or magnetic field, which can interface with the RC of the wearable device to supply current to the onboard power source of the wearable device to charge it. To be effective at charging the wearable device, the TC 112 must be within a predetermined distance from the RC of the wearable device. Therefore it is desirable to align or closely position the wearable device relative to the charging device 100 such that the TC 112 and the RC are in close proximity to one another, e.g., within a predetermined distance, such that the wearable device can be effectively charged. In some embodiments, the predetermined distance can be in a range from 2 mm to 5 mm. The TC 112 can be coupled to or disposed on an electronics circuit board of the charging device 100, which can supply current to the TC 112 for generating an electromagnetic or magnetic field.

The TC 112 may be disposed within a housing of the support structure 110, e.g., so that the TC 112 is protected from external elements. The TC 112, however, may be located at a position that enables it to be close in proximity to the wearable device when the wearable device is supported by, engaged with, or otherwise received by the support structure 110. In some embodiments, the TC 112 can be positioned close to an outer surface of the support structure 110. In some embodiments, multiple TCs 112 may be disposed within the support structure 110 and spaced apart from one another (e.g., along a length, width, height, etc., of the support structure 110). In some embodiments, the TC 112 can have a configuration or shape that corresponds to or can align with a surface, edge, corner, etc., of the support structure 110. For example, the TC 112 may have a curved configuration, which can be configured to align with a curved surface of the support structure 110. Alternatively, the TC 112 may be positioned and/or oriented adjacent to a curved surface of the support structure 110.

As noted above, it can be important to ensure that the TC 112 of the charging device 100 is positioned in close proximity with the RC of a wearable device. Therefore, in some embodiments, the charging device 100 can also include an AE 116. The AE 116 is configured to align the wearable device with the charging device 100, e.g., so that the RC of the wearable device is aligned with the TC 112 (or in the case of multiple TCs, at least one of the TCs). When the TC 112 and the RC are aligned, the charging device 100 can charge the wearable device (e.g., a power source of the wearable device, such as a battery). In some embodiments, the AE 116 is configured to align the RC of the wearable device with the TC 112 when at least a portion of the wearable device (e.g., a side, surface, or portion) is within a predetermined distance from the support structure 110.

In some embodiments, the AE 116 is configured to couple to at least one corresponding AE (also referred to herein as "corresponding AE") of the wearable device, e.g., to facilitate the alignment between the RC of the wearable device and the TC 112. For example, the AE 116 may be a magnet configured to magnetically couple to at least one corresponding magnet (also referred to herein as "corresponding magnet") of the wearable device to cause the RC to align with the TC 112. Additionally or alternatively, the AE 116 may be associated with or otherwise include one or more visual indicators (e.g., markers, mechanical features such as grooves, protrusions, or recesses, etc.) configured to cause and/or facilitate alignment between the TC 112 and the RC. The visual indicators can guide a user in positioning the wearable device in proper aligning with the charging device 100. For example, a user can be instructed to align a visual indicator disposed on the wearable device with a corresponding indicator disposed on the support structure 110 of the charging device 100. Additionally or alternatively, the charging device 100 may be coupled to or in communication with an external device (e.g., smartphone) that can notify and/or confirm to a user that an associated wearable device is or is not aligned with the charging device 100 for effective charging. In some embodiments, after the AE 116 has aligned the RC with the TC 112, the AE 116 can maintain a position and/or orientation of the support structure 110 and the wearable device relative to one another, e.g., to maintain, support, etc., alignment between the TC 112 and the RC.

In some embodiments, the AE 116 is disposed within a housing of the support structure 110. In some embodiments, the AE 116 is positioned adjacent to or near the TC 112. For example, the AE 116 is positioned adjacent to or near the TC 112 along a wall or surface of the support structure 110. In some embodiments, the AE 116 is spaced at least a minimum distance apart from the TC 112, e.g., to not interfere with the inductive charging. In some embodiments, the charging device 100 can include a plurality of AEs 116, where the plurality of AEs 116 can cooperate together to align the wearable device with the charging device 100. For example, the plurality of AEs 116 can be configured to couple to corresponding AEs of the wearable device in a set configuration that facilitates alignment of the TC 112 with the RC of the wearable device. In some embodiments, the AE 116 and/or the corresponding AE of the wearable device can be electromagnets that are driven to take on charge, e.g., to couple to one another to facilitate alignment.

Optionally, the charging device 100 can include an indicator 114. The indicator 114 is configured to indicate a charge status (e.g., charging, charged, not charged, etc.) of the wearable device (e.g., a battery or other onboard power source of the wearable device). Additionally or alternatively, the indicator 114 is configured to indicate an alignment status (e.g., partially aligned, aligned, not aligned, etc.) of the RC and the TC 112. In some embodiments, the indicator 114 is disposed on the support structure 110. For example, the indicator 114 can be disposed on an outside surface (e.g., a bottom surface, a side surface, an inclined surface, etc.) of the support structure 110, where the indicator 114 can be visible to a user. In some embodiments, the indicator 114 is disposed within a housing of the support structure 110 but can be visible from outside of the support structure 110. For example, the support structure 110 may be transparent (or have a transparent portion) and/or include a through-hole or opening such that a portion of the indicator 114 is visible from outside of the support structure 110. In some embodiments, the indicator 114 can include a light source (e.g., a light-emitting diode (LED)). Additionally or alternatively, the indicator 114 can include a speaker configured to emit a sound to indicate the charging status and/or the alignment status of the wearable device. In some embodiments, the indicator 114 can indicate the charging status by a first indicator (e.g., light, sound, etc.) and the alignment status by a second indicator (e.g., light, sound, etc.), different from the first indicator. In some embodiments, the charging device 100 (or onboard processor of the charging device) can be configured to determine when the wearable device has been set on a charging position by controlling and/or measuring the charging current of the TCs. In some embodiment, systems and devices described herein can be configured to measure an amount of current being provided to the TC to determine a status of the charging of the wearable device.

Optionally, the charging device 100 can include a port 118, e.g., for coupling to an external power source 130. The port 118 can be configured to receive a wired connection to the power source 130 (e.g., a wire that extends from the port 118 to the power source 130). When the wired connection is received in the port 118, the port 118 can be configured to couple the power source 130 to onboard circuitry (e.g., circuit board) of the charging device 100. Accordingly, the port 118 enables the power source 130 to provide power to the onboard circuitry of the charging device 100, e.g., to supply current for driving the TC 112 so that the TC 112 can facilitate wireless charging of the RC (e.g., upon contact and/or proximity to a wearable device).

As shown in FIG. 1, the power source 130 is shown as being separate from, external to, and/or different from the support structure 110 (also referred to herein as "external power source"). In such examples, the power source 130 may be an external battery, a wall power source, etc. Alternatively, or additionally, the charging device 100 may include or contain the power source 130. For example, the power source 130 may be a battery disposed within the support structure 110 such that the power source 130 is integral to the charging device 100 (also referred to herein as "integral power source"). In such examples, the integral power source 130 is rechargeable or replaceable to provide power to the charging device 100, e.g., for charging the wearable device.

Optionally, in some embodiments, the charging device 100 can include an enclosure 140. The enclosure 140 can be a covering, cap, sleeve, etc. In some embodiments, the enclosure 140 can be configured to at least partially cover (e.g., partially cover, fully cover, etc.) the support structure 110. In some embodiments, the enclosure 140 at least partially covers the support structure 110 and the wearable device when supported by, engaged with, or otherwise received by the support structure 110. In some embodiments, the enclosure 140 is attachable to/detachable from the support structure 110. For example, the enclosure 140 may be attached to the support structure 110 via a hinge and/or pin such that the enclosure 140 can rotate or otherwise move relative to the support structure to cover the support structure 110. In some embodiments, the enclosure 140 is integral with the support structure 110. In other words, the support structure 110 can include a portion that functions as a cover or enclosure. The enclosure 140 can be configured to protect or shield the support structure 110. Additionally, or alternatively, the enclosure 140 can be configured to protect or shield a wearable device that is being charged by the charging device 100. In some embodiments, the enclosure 140 can reduce accidental movement of the wearable device relative to the charging device 100. In some embodiments, the enclosure 140 can be movable or reconfigurable, e.g., to allow the wearable device to be positioned on the charging device 100 and/or to allow the wearable device to be removed from the charging device 100. For example, the enclosure 140 can include or define a door or other movable component that enables the wearable device to be positioned on the support structure 110 and/or to be removed from the support structure 110. Additionally or alternatively, the enclosure 140 may include one or more visual indicators (e.g., markers and/or other mechanical features such as grooves, protrusions, recesses, etc.) configured to cause and/or facilitate alignment between the TC 112 and the RC of the wearable device. In some embodiments, the indicator 114 is visible from outside of the enclosure 140. For example, the enclosure 140 may be transparent (or have a transparent portion) and/or include a through-hole or opening such that a portion of the indicator 114 is visible from outside of the enclosure 140. In some embodiments, the enclosure 140 is configured to enable sounds emitted by the indicator 114 to be audible from outside of the enclosure 140 (e.g., to a user).

Figure 2:
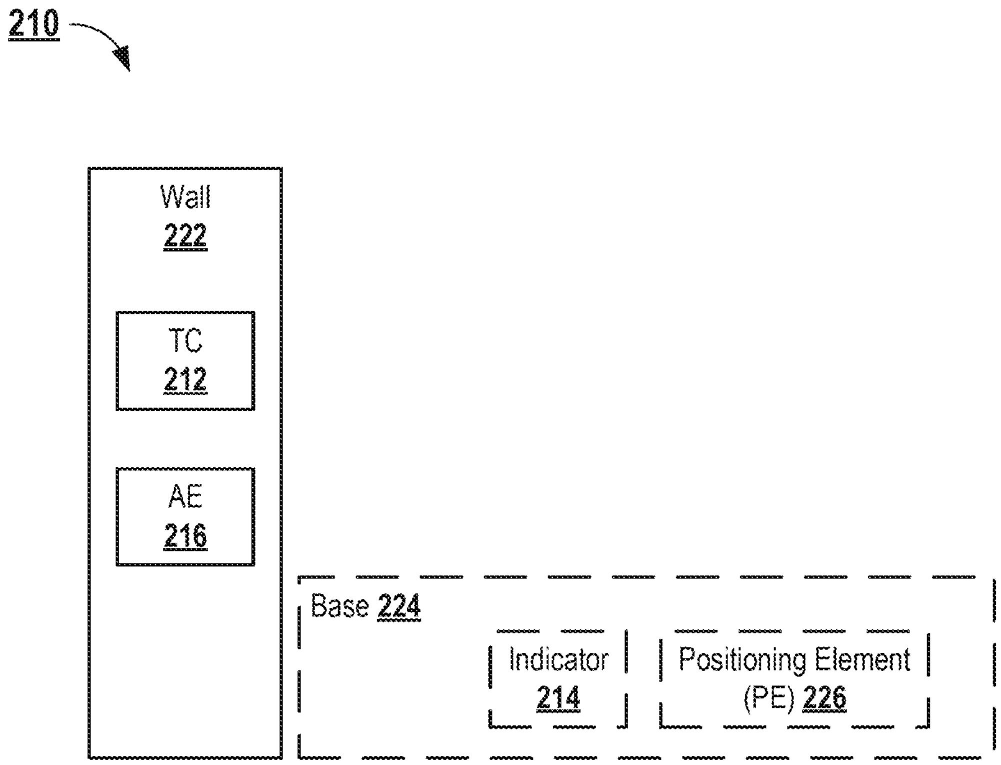
FIG. 2 is a schematic illustration of a support structure of a charging device for charging a wearable device.

FIG. 2 is a schematic illustration of a support structure 210 of a charging device, according to embodiments. The support structure 210 of FIG. 2 is structurally and/or functionally similar to the support structure 110 of FIG. 1. The support structure 210 can include a wall 22 and, optionally, a base 224. The wall 222 can house a TC 212 (e.g., structurally and/or functionally similar to the TC 112 of FIG. 1) and an AE 216 (e.g., structurally and/or functionally similar to the AE 116 of FIG. 1). The base 224 may optionally include an indicator 214 (e.g., structurally and/or functionally similar to the indicator 114 of FIG. 1) and/or a positioning element 226 (PE) (also referred to herein as "PE").

The base 224 can be a platform, foundation, etc., of the support structure 210. The base 224 can be configured to receive and hold a wearable device (e.g., wearable device 350, as described with reference to FIG. 3). The base 224 can rest on or otherwise be positioned on a flat surface (e.g., of a table or other furniture or equipment, the floor, etc.). The base 224 may be attached to the wall 222. For example, the base 224 and the wall 222 can form an unitary structure. In some embodiments, the base 224 may be attachable to and/or detachable from the wall 222.

As shown in FIG. 2, the base 224 can include the indicator 214. Similar to the indicator 114, the indicator 214 can be configured to indicate a charging status or alignment status of the wearable device. Alternatively, the wall 222 may include the indicator 214. In some embodiments, the wall 222 can include a first indicator 214 and the base 224 can include a second indicator 214.

The base 224 can also include a PE 226, such as, for example, a mechanical component or other feature that is configured to facilitate positioning of the wearable device relative to the support structure 210. For example, the PE 226 can be configured to influence or drive the positioning of the wearable device on the base 224. In an example implementation, the base 224 can include a PE 226 that is implemented as an inclined surface that is tilted and/or angled so that a wearable device positioned on the base 224 can be driven via gravity force to be closer to one side of the base 224. In particular, the inclined surface can be titled or angled toward the wall 222, and therefore configured to direct the wearable device via its angled surface toward or more proximate to the wall 222. In other words, a thickness of the base 224 near the wall may be less than a thickness of the base 224 distanced from the wall. When the wearable device is positioned on the inclined surface, the wearable device can be gravitationally driven towards the wall 222. Increasing proximity between the wearable device and the wall 222 can allow the AE 216 to align the TC 212 with the RC of the wearable device (e.g., for more effective and/or efficient charging of the wearable device), as described above with respect to the AE 116 of FIG. 1. Increasing proximity between the wearable device and the wall 222 also positions the RC of the wearable device closer to the TC 212, which can also increase the effectiveness of the charging. In some embodiments, the PE 226 may include rollers, tracks, or other features that further facilitate controlled movement of the wearable device via the gravitational forces toward the wall 222. In some embodiments, the base 224 may include a material with low friction, such that it facilitates movement of the wearable device toward the wall 222.

The wall 222 can be configured to contact and receive at least a portion of the wearable device. The wall 222 may include a vertical surface that extends substantially vertically (e.g., within about 5 degrees) from the flat surface on which the support structure 210 is disposed (e.g., the ground, a tabletop, etc.). In some embodiments, the wall 222 can house the TC 212 and the AE 216, e.g., the TC 212 and the AE 216 can be disposed within an interior of a housing of the wall 222. Alternatively, the AE 216 and the TC 212 may be positioned on an outer surface of the wall 222.

In some embodiments, the wall 222 can include a surface that can be configured to receive the wearable device. In some embodiments, the surface of the wall 222 is concave or curved (also referred to herein as "concave surface" or "curved surface") such that the concave surface is shaped to receive (e.g., nest with) the wearable device, such as, for example, a ring-shaped device. As such, the concave surface of the wall 222 can surround a portion of an outer annular surface of a ring-shaped device. The concave surface can also facilitate positioning of the ring-shaped device against the wall 222 so that the RC of the ring-shaped device can be positioned in close proximity to the TC 212. The proximity can also enable the AE 216 to align the RC and the TC 212 with one another. The wall can also have other surfaces and/or portions that may exhibit other shapes (e.g., flat, convex, etc.). While a concave surface is described herein, it can be appreciated that other surface shapes can also facilitate placement of a wearable device relative to the wall 222. For example, instead of a concave surface, multiple flat surfaces that are angled to form a cavity or recess for receiving a ring-shaped wearable device can also be used.

As noted above, the support structure 210 optionally includes a base 224. Therefore, in some embodiments, the support structure 210 includes a wall 222 without a base 224. In such embodiments, the wearable device can be positioned on the same flat surface on which the wall 222 is disposed and in proximity to the wall 222, e.g., in contact with a concave or curved surface of the wall 222, so that the charging device can charge the power source (e.g., battery) of the wearable device.

Figure 3:
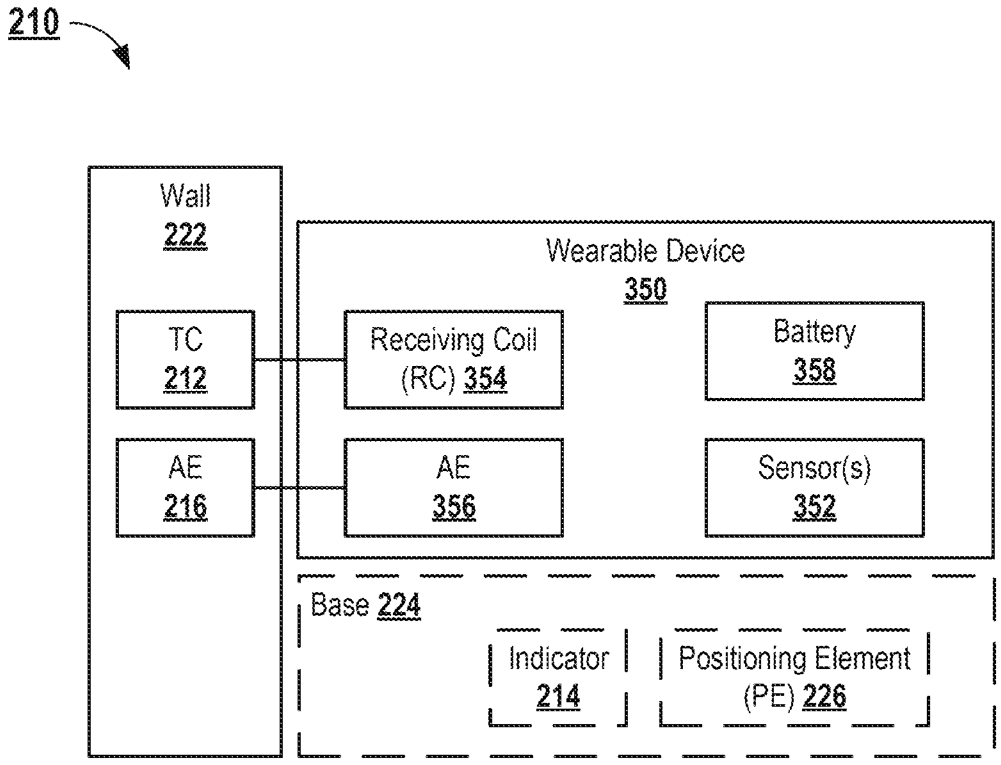
FIG. 3 is a schematic illustration of a wearable device interfacing with the support structure of FIG. 2.

FIG. 3 is a schematic illustration of a wearable device 350 positioned with respect to the support structure 210 of FIG. 2, according to an embodiment. The wearable device 350 can be structurally and/or functionally similar to other wearable devices described herein. The wearable device 350 includes a RC 354, an AE 356, a battery 358 (or other onboard power source), and sensor(s) 352. While not depicted, the wearable device 350 can also include onboard circuitry, e.g., for controlling and/or supplying power to various components of the wearable device 350. In some embodiments, the onboard circuitry can be a flexible printed circuit board on which one or more of the RC 354, AE 356, and battery 358 can be disposed.

The battery 358 can supply power to the wearable device 350. For example, the battery 358 can supply power to the sensor(s) 352, the RC 354, and the AE 356 to power operation of those components. The sensor(s) 352 can be configured to measure physiological data associated with a user that wears the wearable device 350. For example, the sensor(s) 352 can include one or more electrodes, a photoplethysmogram (PPG) sensor, a temperature sensor, a motion sensor, a skin conductance sensor, or other suitable sensors configured to measure one or more physiological parameters of a user. In some embodiments, the sensor(s) 352 can be configured to periodically capture physiological data of the user, e.g., at set intervals or on demand. In some embodiments, the sensor(s) 352 can be configured to continuously monitor the physiological parameter(s) of the user.

The battery 358 can be recharged using a charging device (e.g., charging device 100) by being positioned on or adjacent to a support structure, such as support structure 210 as depicted in FIGS. 2 and 3. In embodiments where the support structure 210 includes a base 224, the wearable device 350 may be placed on the base 224. As described above, the base 224 can include a PE 226 (e.g., an inclined surface) that can actively and/or passively cause the wearable device 350 to be disposed at a position relative to the support structure 210 that is closer to the TC 212, such as, for example, a position against the wall 222 of the support structure 210.

The wearable device 350 can include an AE 356, which is configured to facilitate alignment of the RC 354 of the wearable device 350 with the TC 212. When the AE 356 is positioned within a predetermined distance from the AE 216, the two can be configured to align with one another so that the TC 212 and the RC 354 are aligned. In some embodiments, the AE 356 of the wearable device 350 and the AE 216 of the charging device can be magnets (or electromagnets) that are configured to couple to one another. Therefore, when the wearable device 350 comprising the magnet 356 is positioned within a predetermined distance from the magnet 216, the magnet 216 can further adjust a position of the wearable device 350 by coupling to and/or attracting the magnet 356. For example, the magnet 216 may have a first pole (e.g., a south pole) facing the wearable device 350 and the magnet 356 may have a second pole (e.g., a north pole) facing the wall 222. Accordingly, a magnetic field induced by the first and second magnets can cause the wearable device 350 to adjust position (e.g., rotate, slide, translate, etc.) based on magnetic attraction between the magnets. As schematically shown in FIG. 3, the coupling (e.g., magnetic coupling) of the AE 216 and the AE 356 can result in alignment and/or proximity between the TC 212 and the RC 354.

The alignment between the RC 354 and the TC 212 enables the two to interface with one another to facilitate wireless charging of the battery 358 of the wearable device 350. As described above, the TC 212 can generate a magnetic field that can induce current in the RC 354, which can be used to recharge the battery 358.

Figure 4A:
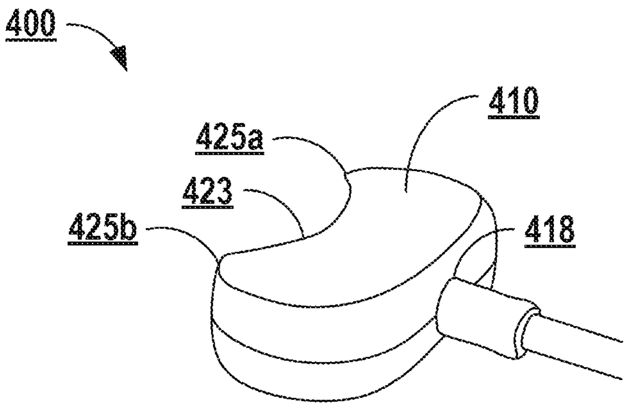
FIG. 4A is a perspective view of an example charging device, according to an embodiment.
Figure 4B:
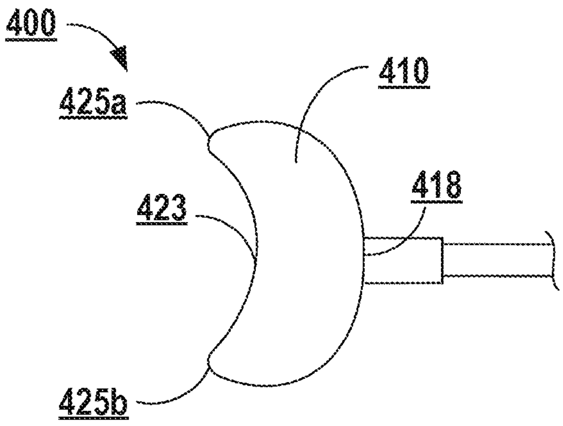
FIG. 4B is a top view of the charging device of FIG. 4A, according to an embodiment.
Figure 4C:
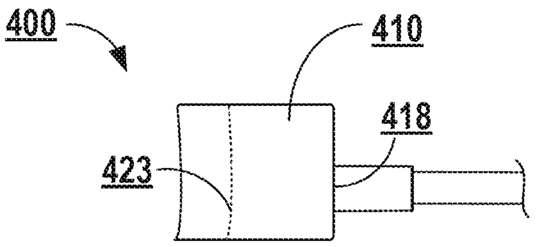
FIG. 4C is a side view of the charging device of FIG. 4A, according to an embodiment.

FIG. 4A is a perspective view of an example charging device 400, according to an embodiment. FIG. 4B is a top view of the charging device 400 of FIG. 4A. FIG. 4C is a side view of the charging device 400 of FIG. 4A. The charging device 400 of FIGS. 4A-4C can include components that are structurally and/or functionally similar to other charging devices and/or components thereof described herein, including, for example, the charging device 100 of FIG. 1 and the support structure 210 of FIGS. 2 and 3. For example, the charging device 400 includes a support structure 410 (e.g., structurally and/or functionally similar to the support structure 110 of FIG. 1 and/or the support structure 210 of FIGS. 2 and 3) and a port 418 (e.g., structurally and/or functionally similar to the port 418 of FIG. 1). The support structure 410 includes a wall (e.g., structurally and/or functionally similar to the wall 222 of FIGS. 2 and 3) without a base.

The support structure 410 can include a housing that defines an interior. The port 418 can extend out from the housing, e.g., to couple to an external power source. The housing of the support structure 410 can include a concave or curved surface 423. The housing of the support structure 410 can store and/or contain one or more TCs (not shown) (e.g., structurally and/or functionally similar to the TC 112 of FIG. 1 and/or the TC 212 of FIGS. 2 and 3) and/or AEs (not shown) (e.g., structurally and/or functionally similar to the AE 116 of FIG. 1 and/or the AE 216 of FIGS. 2 and 3). The housing can also support or house an indicator (not shown) (e.g., structurally and/or functionally similar to the indicator 114 of FIG. 1 and/or the indicator 214 of FIGS. 2 and 3).

The concave surface 423 can be configured to receive and contact an outer side of a wearable device. In some embodiments, the concave surface 423 can be shaped or have dimensions that are suitable for receiving a ring-shaped wearable device (e.g., ring-shaped wearable device 650 depicted in FIGS. 5A-5E). For example, the concave surface 423 has a height that is about the same height (e.g., within 5 mm) as the wearable device. The concave surface 423 can have a radius of curvature that accommodates (e.g., can receive) ring-shaped devices having ring sizes of between US size 3 and US size 16. For example, the concave surface 423 can (i) have a radius of curvature capable of receiving a ring-shaped device having a ring size of US size 16 and (ii) be capable of receiving ring-shaped devices having ring sizes less than US size 16. In some embodiments, the concave surface 423 can have a radius of curvature between about 5 mm and about 15 mm, inclusive of all sub-ranges and values therebetween.

The housing of the support structure 410 can have a configuration or shape that can house the necessary components for facilitating wireless charging of the wearable device but have a small profile, e.g., to reduce the space needed for the charging device 400. In some embodiments, the housing can have a height that is equal to (or substantially equal to) a height of the wearable device, e.g., to reduce size of the charging device 400. In some embodiments, the housing of the support structure 410 can have a curved shape or body, e.g., similar to a crescent. Alternatively, the housing can have other surfaces that are not curved, e.g., are flat, angled, etc.

The curvature of the concave surface 423 can be designed to provide an indication of and/or guide user placement of a ring-shaped wearable device relative to the support structure 410 (and components contained therein, such as the TC and/or AE). In some embodiments, the concave surface 423 can have a predefined arc length that is sufficiently large to receive the ring-shaped wearable device but also sufficiently small such that placement of the ring-shaped wearable device along any point in contact with the surface 423 can enable alignment of the ring-shaped wearable device with the charging device 400, and specifically, the RC of the ring-shaped wearable device with the TC of the charging device 400. For example, the concave surface 423 can have an arc length of between about 15 and 30 mm, inclusive of all sub-ranges and values therebetween. In some embodiments, the shape of the concave surface 423 can also provide visual feedback to a user when the user is positioning the wearable device. For example, the user can be guided to position the wearable device at a point close to a central location of the concave surface 423. In some embodiments, the support structure 410 can have features (e.g., pointed portions 425*a*, 425*b*), which can provide haptic or mechanical feedback (e.g., to a user) as they position the ring-shaped device against the concave surface 423 (e.g., to a central location associated with the concave surface 423). The pointed portions 425*a*, 425*b* can be examples of a positioning element (e.g., the PE 226 as described above). Further, the pointed portions 425*a*, 425*b* and the concave surface 423 can maintain lateral positioning of the ring-shaped device or reduce lateral shifting and/or movement of the ring-shaped device relative to the support structure 410. For example, as described above, the charging device 400 can include an AE, which can align with a corresponding AE in the ring-shaped device, e.g., for subsequent charging. During the alignment, the AE of the charging device 400 can cause the ring-shaped device to rotate (e.g., based on magnetic coupling of the AE of the charging device 400 and the corresponding AE of the ring-shaped device). In such instances, the pointed portions 425*a*, 425*b* and the concave surface 423 can limit or prevent lateral movement (e.g., along a flat surface supporting the support structure 410) of the ring-shaped device as the ring-shaped device rotates to alignment with the support structure 410 (e.g., to alignment with the TC in the support structure 410).

Figure 5A:
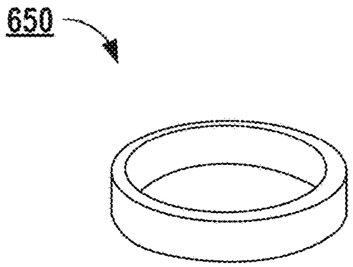
FIG. 5A is a perspective view of a wearable device, according to an embodiment.
Figure 5B:
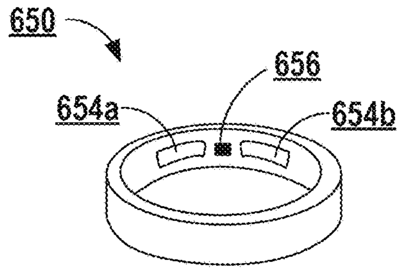
FIG. 5B is a perspective view of the wearable device of FIG. 5A illustrating the internal components of the wearable device, according to an embodiment.

FIG. 5A is a perspective view of a wearable device implemented as a ring-shaped wearable device 650, according to an embodiment. FIG. 5B is a perspective view of the wearable device 650 of FIG. 5A illustrating the internal components of the wearable device 650. The wearable device 650 of FIGS. 5A and 5B can be structurally and/or functionally similar to other wearable devices described herein, e.g., the wearable device 350 of FIG. 3. For example, the wearable device 650 includes RCs 654*a*, 654*b* (e.g., structurally and/or functionally similar to the RC 354 of FIG. 3) and an AE 656 (e.g., structurally and/or functionally similar to the AE 356 of FIG. 3). As shown in at least FIG. 5B, the RC 654*b* can be spaced apart from the RC 654*a* (e.g., along an inner side of the ring-shaped device 650). Further, the AE 656 may be positioned between the RCs 654*a*, 654*b*. The RCs 654*a*, 654*b* can be coupled to a power source (e.g., a battery) of the wearable device 650.

Figure 5C:
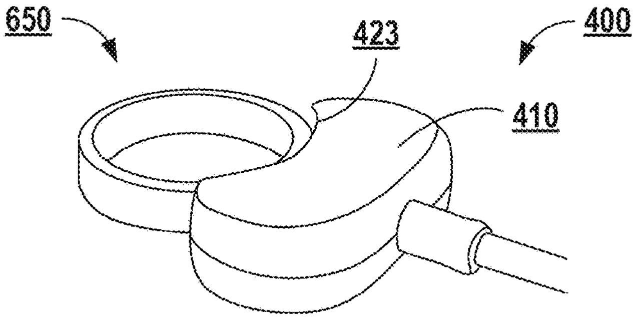
FIG. 5C is a perspective view of the wearable device of FIG. 5A interfacing with the charging device of FIG. 4A, according to an embodiment.
Figure 5D:
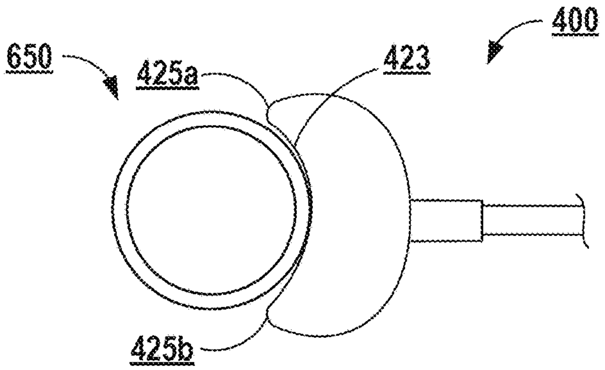
FIG. 5D is a top view of the wearable device of FIG. 5A interfacing with the charging device of FIG. 4A, according to an embodiment.
Figure 5E:
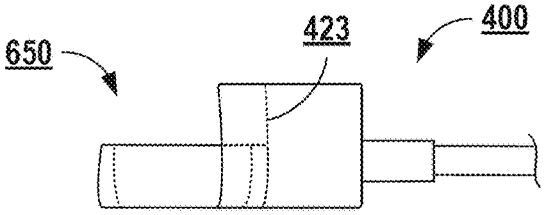
FIG. 5E is a side view of the wearable device of FIG. 5A interfacing with the charging device of FIG. 4A, according to an embodiment.

FIG. 5C is a perspective view of the wearable device 650 of FIG. 5A interfacing with the charging device 400 of FIG. 4A, according to an embodiment. FIG. 5D is a top view of the wearable device 650 of FIG. 5A interfacing with the charging device 400 of FIG. 4A. FIG. 5E is a side view of the wearable device 650 of FIG. 5A interfacing with the charging device 400 of FIG. 4A. The concave surface 423 can be configured to receive and contact the wearable device 650. For example, the concave surface 423 can include a first curvature along a first direction (e.g., from pointed portion 425*a* to pointed portion 425*b*) such that the concave surface 423 can receive and contact the outer annular surface of the ring-shaped device 650. Additionally and/or alternatively, the concave surface 423 can include a second curvature in a second direction (e.g., from a top side of the support structure 410 to a bottom side of the support structure 410) different from the first direction such that the concave surface 423 can receive and contact the outer annular surface of the ring-shaped device 650. In some embodiments, the first curvature of the concave surface 423 can align with at least a portion of a perimeter of the ring-shaped device 650. In some embodiments, the second curvature of the concave surface 423 can align with a thickness or other rounded edge of the ring-shaped device 650. The charging device 400 includes an AE (not shown) that can be configured to cause, e.g., based on a coupling or other interaction with the AE 656, position adjustment (e.g., rotation) of the ring-shaped device 650. The AE of the charging device 400 can cause alignment between the at least one TC (not shown) of the charging device 400 and at least one of the RCs 654*a*, 654*b* to facilitate charging of the wearable device 650. In some embodiments, the AE of the charging device 400 can cause such alignment when the wearable device 650 is in contact with the concave surface 423. Additionally or alternatively, the AE of the charging device 400 can cause such alignment when the wearable device 650 is proximate to (e.g., within a predetermined distance from) the concave surface 423. As shown in FIG. 5E, a height of the concave surface 423 can be greater than a height of the wearable device 650 when then wearable device 605 is resting flat on a surface (e.g., a same surface as the charging device 400). Alternatively, a height of the concave surface 423 can be equal to or less than a height of the wearable device 650 when wearable device 650 is resting flat on a same surface of the charging device 400.

Figure 6A:
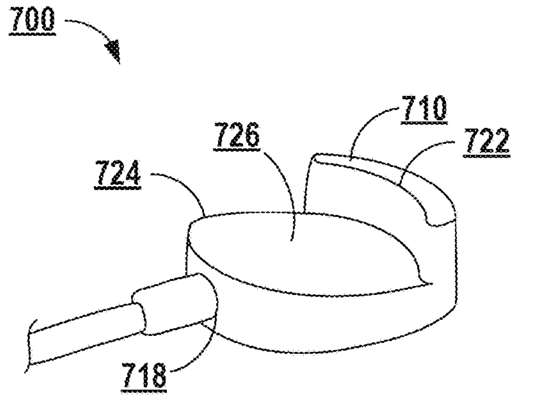
FIG. 6A is a perspective view of an example charging device, according to an embodiment.
Figure 6B:
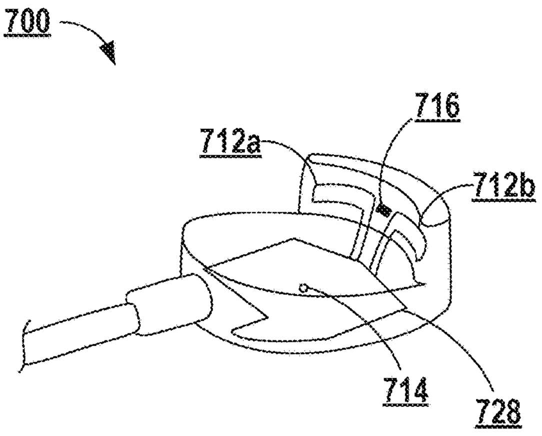
FIG. 6B is a perspective view of the charging device of FIG. 6A illustrating the internal components of the charging device, according to an embodiment.
Figure 6C:
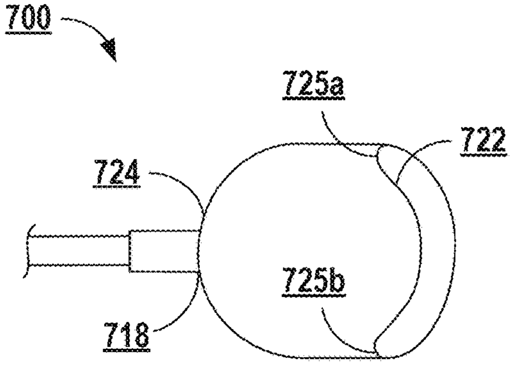
FIG. 6C is a top view of the charging device of FIG. 6A, according to an embodiment.
Figure 6D:
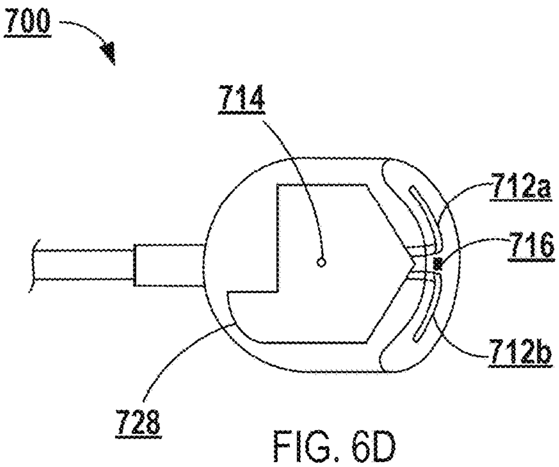
FIG. 6D is a top view of the charging device of FIG. 6A illustrating the internal components of the charging device, according to an embodiment.
Figure 6E:
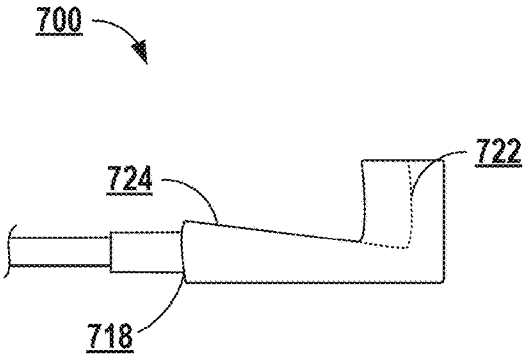
FIG. 6E is a side view of the charging device of FIG. 6A, according to an embodiment.
Figure 6F:
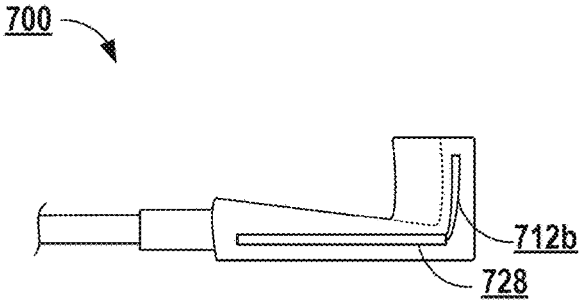
FIG. 6F is a side view of the charging device of FIG. 6A illustrating the internal components of the charging device, according to an embodiment.

FIG. 6A is a perspective view of another example charging device 700, according to an embodiment. FIG. 6B is a perspective view of the charging device 700 of FIG. 6A illustrating the internal components of the charging device 700. FIG. 6C is a top view of the charging device 700 of FIG. 6A. FIG. 6D is a top view of the charging device 700 of FIG. 6A illustrating the internal components of the charging device 700. FIG. 6E is a side view of the charging device 700 of FIG. 6A. FIG. 6F is a side view of the charging device 700 of FIG. 6A illustrating the internal components of the charging device 700. The charging device 700 of FIGS. 6A-6F can include components that are structurally and/or functionally similar to other charging devices and/or components thereof described herein, including, for example, the charging device 100 of FIG. 1, the charging device 400 of FIGS. 4A-5E, and the support structure 210 of FIGS. 2 and 3. For example, the charging device 700 includes a support structure 710 (e.g., structurally and/or functionally similar to the support structure 110 of FIG. 1, the support structure 210 of FIGS. 2 and 3, and/or the support structure 410 of FIG. 4A-5E) and a port 718 (e.g., structurally and/or functionally similar to the port 118 of FIG. 1).

The support structure 710 includes an indicator 714 (e.g., structurally and/or functionally similar to the indicator 114 of FIG. 1 and/or the indicator 214 of FIGS. 2 and 3), a wall 722 (e.g., structurally and/or functionally similar to the wall 222 of FIGS. 2 and 3 and/or the curved surface 423 of FIGS. 4A-5E) having ends or pointed portions 725*a*, 725*b* (e.g., structurally and/or functionally similar to the pointed portions 425*a*, 425*b* of FIGS. 4A-5E), and a base 724 (e.g., structurally and/or functionally similar to the base 224 of FIGS. 2 and 3) having a PE 726 (e.g., structurally and/or functionally similar to the PE 226 of FIGS. 2 and 3). As best shown in FIGS. 6B, 6D, and 6F, the support structure 710 includes or otherwise stores TCs 712*a*, 712*b* (e.g., structurally and/or functionally similar to the TC 112 of FIG. 1 and/or the TC 212 of FIGS. 2 and 3), an AE 716 (e.g., structurally and/or functionally similar to the AE 116 of FIG. 1 and/or the AE 216 of FIGS. 2 and 3). The AE 716 can be positioned between the TCs 712*a*, 712*b*. The TCs 712*a*, 712*b* are spaced apart from one another along an interior of the concave wall 722. Further, the TCs 712*a*, 712*b* can extend to an electronic circuit board 728 (positioned in the base 724). As such, the TCs 712*a*, 712*b* may be at least partially aligned with a curvature of the wall 722 and/or a height of the wall 722. In some embodiments, the electronic circuit board 728 is configured to control and/or provide current to power the TCs 712*a*, 712*b*. In some embodiments, the electronic circuit board 728 includes or supports the indicator 714.

In contrast to the support structure 410 described above, the support structure 710 includes the wall 722 and the base 724. As noted, the base 724 can include the PE 726, which can be structurally similar to other PE(s) described herein. As shown in FIGS. 6A-6F, the PE 726 can be implemented as a sloped or inclined surface that decreases in height or slopes in a direction toward the wall 722, e.g., to enable gravitational forces to cause a wearable device positioned on the base to slide or move toward the wall 722. In some embodiments, the sloped surface is positioned at an angle of between approximately 10 degrees and approximately 30 degrees relative to a flat surface on which the base 724 rests. As such, the base 724 can have a generally wedged shape as it decreases in thickness closer to the wall 722. The wall 722 can extend upwards (e.g., substantially perpendicular to or vertically from) the flat surface. The base 724 can be coupled to the wall 722. In some embodiments, the base 724 and the wall 722 are part of a same unitary structure. Alternatively, the base 724 and/or the wall 722 may have a modular structure and be detachable to or from one another. The port 718 can be positioned in the base 724, e.g., at a location that does not interfere with placement of a wearable device on the support structure 710. The indicator 714 can be positioned on the base 724 at a location that is visible, e.g., when the wearable device is positioned on the base 724. In some embodiments, the indicator 714 is disposed on or otherwise visible through the base 724. For example, the indicator 714 is disposed on or otherwise visible through a middle or central portion of the sloped surface of the base 724. In some embodiments, the indicator 714 is disposed on another surface (e.g., of the support structure 710, of the base 724, etc.) that extends away from the concave wall 722.

Figure 7A:
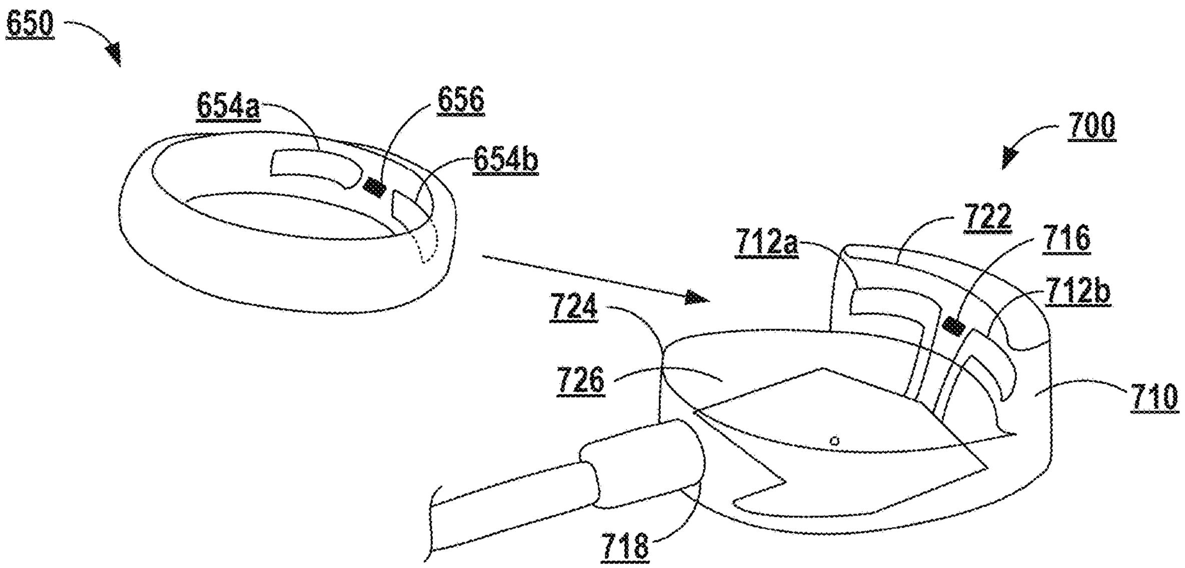
FIG. 7A is a perspective view of the wearable device of FIG. 5A interfacing with the charging device of FIG. 6A showing internal components of the wearable device and the charging device, according to an embodiment.
Figure 7B:
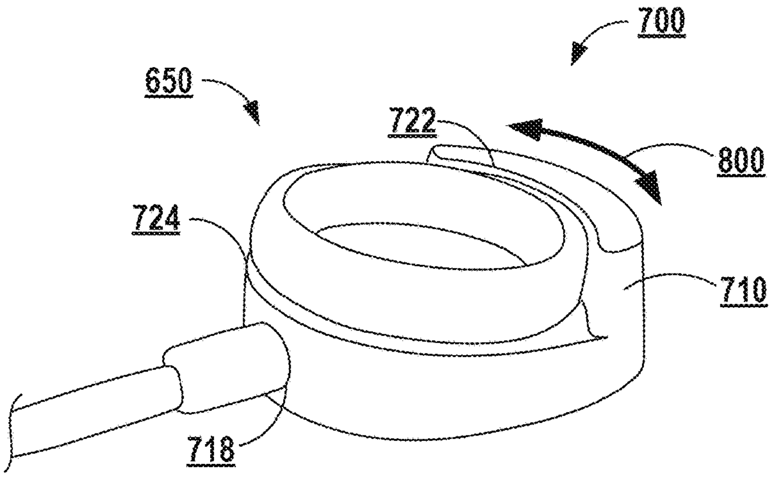
FIG. 7B is a perspective view of the wearable device of FIG. 5A interfacing with the charging device of FIG. 6A, according to an embodiment.

FIG. 7A is a perspective view of the wearable device 650 of FIG. 5A interfacing with the charging device 700 of FIG. 6A showing internal components of the wearable device 650 and the charging device 700, according to an embodiment. FIG. 7B is a perspective view of the wearable device 600 of FIG. 5A interfacing with the charging device 700 of FIG. 6A. The inclined surface (e.g., PE 726) is configured to cause movement of the wearable device 650 such that the wearable device 650 is gravitationally driven towards the concave wall 722. For example, the PE 726 can preferentially drive the wearable device 650 to move toward the concave wall 722. Further, the ends 725*a*, 725*b* (see FIG. 6C) can control lateral movement of the wearable device 650 as the AE 716 couples with the AE 656 to align the RCs 654*a*, 654*b* with the TCs 712*a*, 712*b*, e.g., for charging the wearable device 650. For example, the ends 725*a*, 725*b* maintain a position of the wearable device 650 such that the wearable device 650 remains on the base 724. For example, coupling (e.g., magnetic coupling) of the AE 716 and the AE 656 can cause the wearable device 650 to rotate in a direction as generally indicated by arrows 800. As best shown in at least FIG. 7B, the concave wall 722 and the base 724 are configured to support and contact the ring-shaped device 650 along a bottom side and an outer side of the ring-shaped device 650 without covering or obscuring an upper side and an inner side of the ring-shaped device 650 when the ring-shaped device 650 is positioned on the base 724 against the concave wall 722.

Figure 8A:
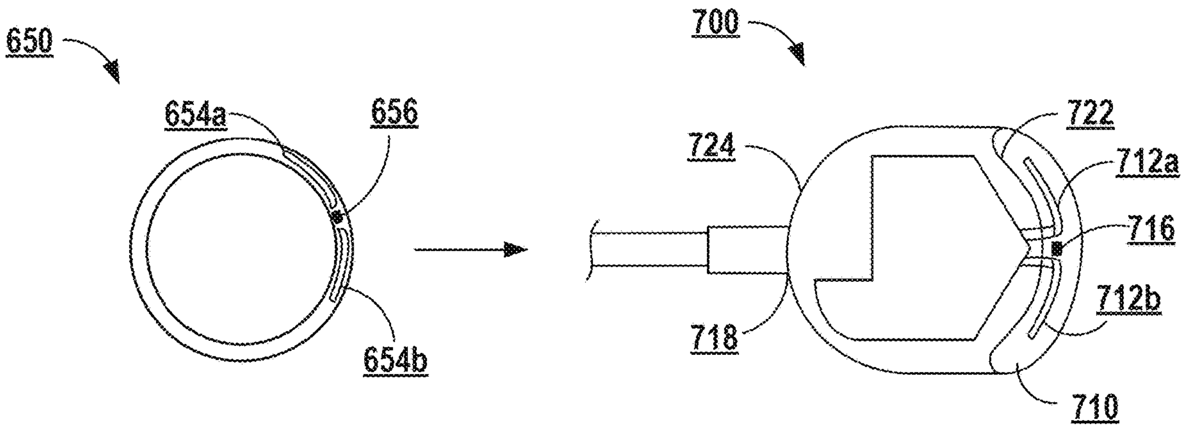
FIG. 8A-8C are top views of the wearable device of FIG. 5A interfacing with the charging device of FIG. 6A showing internal components of the wearable device and the charging device, according to an embodiment.
Figure 8B:
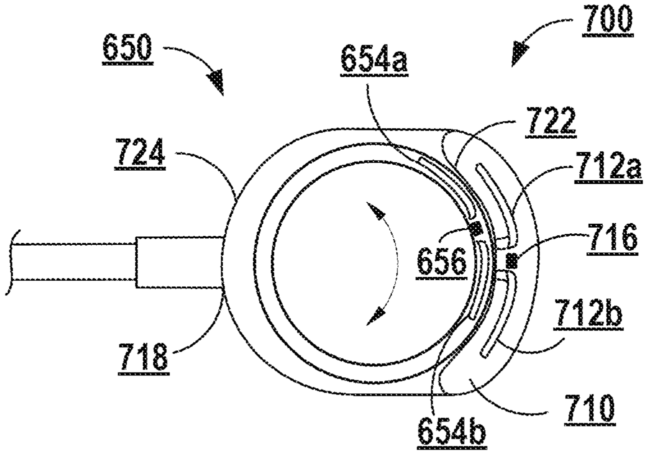
Figure 8C:
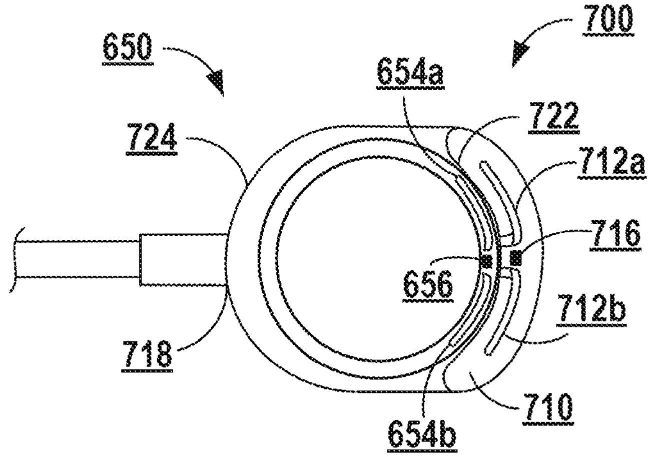
Figure 8D:
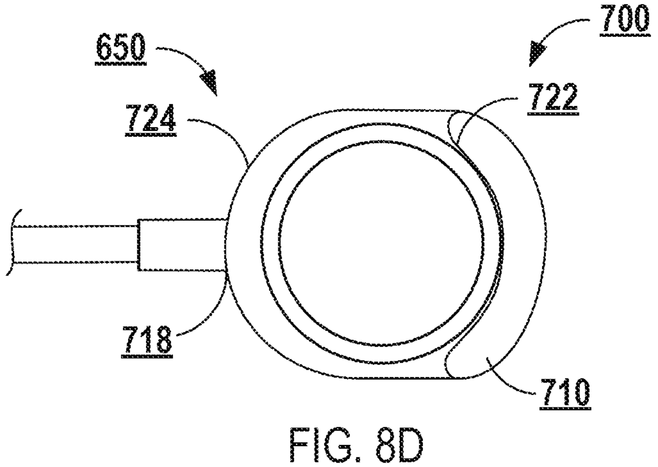
FIG. 8D is a top view of the wearable device of FIG. 5A interfacing with the charging device of FIG. 6A, according to an embodiment.

FIG. 8A-8C are top views of the wearable device 650 of FIG. 5A interfacing with the charging device 700 of FIG. 6A showing internal components of the wearable device 650 (e.g., the RCs 654*a*, 654*b* and the AE 656) and internal components of the charging device 700 (e.g., the TCs 712*a*, 712*b* and the AE 716), according to an embodiment. FIG. 8D is a top view of the wearable device 650 of FIG. 5A interfacing with the charging device 700 of FIG. 6A. As previously mentioned, the AE 716 is configured to couple with the AE 656 to align the RCs 654*a*, 654*b* with the TCs 712*a*, 712*b*, e.g., for charging the wearable device 650. As shown in FIGS. 8B-8C, the wearable device 650 is configured to rotate or move in response to the attraction between the AE 716 (e.g., a first magnet) and the AE 656 (e.g., a second magnet), so that the AE 716 and the AE 656 can align. FIG. 8B depicts the wearable device 650 in an initial position before alignment, and FIG. 8C depicts the wearable device in an adjusted position after alignment. Further, the AE 716 coupling with and aligning with the AE 656 causes alignment and/or proximity between the TC 712*a* and the RC 645*a* and, likewise, between the TC 712*b* and the RC 654*b*, e.g., to enable efficient or effective charging of the wearable device 650.

Figure 9C:
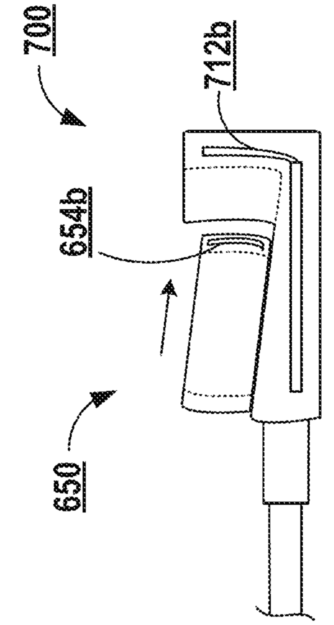
FIGS. 9C-9D are side views of the wearable device of FIG. 5A interfacing with the charging device of FIG. 6A showing internal components of the wearable device and the charging device, according to an embodiment.
Figure 9D:
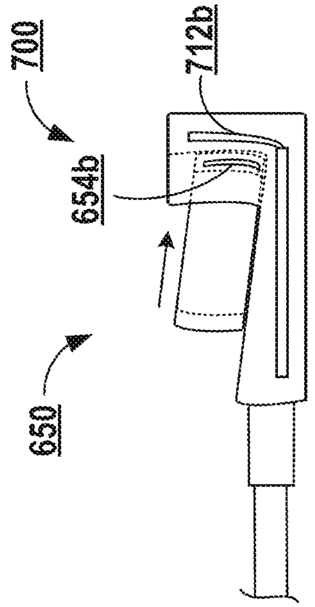
Figure 9A:
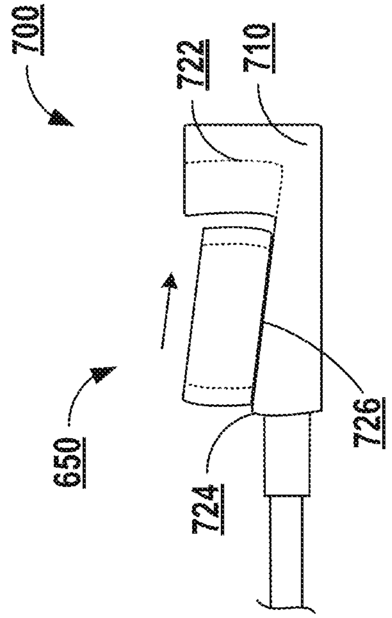
FIGS. 9A-9B are side views of the wearable device of FIG. 5A interfacing with the charging device of FIG. 6A, according to an embodiment.
Figure 9B:
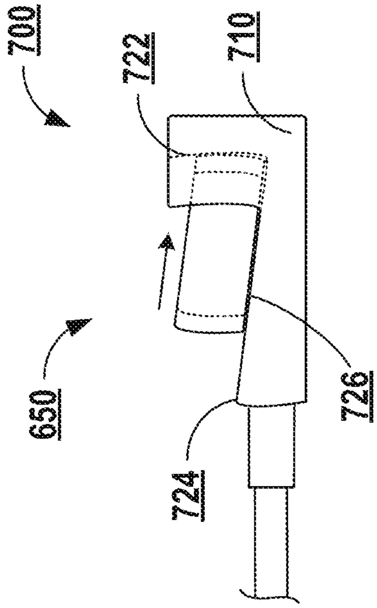

FIGS. 9A-9B are side views of the wearable device 650 of FIG. 5A interfacing with the charging device 700 of FIG. 6A, according to an embodiment. FIGS. 9C-9D are side views of the wearable device 600 of FIG. 5A interfacing with the charging device 700 of FIG. 6A showing internal components of the wearable device 650 (e.g., the RC 654*b*) and internal components of the charging device 700 (e.g., the TC 712*b*). The inclined surface (e.g., PE 726) is configured to allow the wearable device 650 to move toward the concave wall 722 based on gravitational forces. In other words, the inclined surface can be configured to allow the wearable device 650 to be gravitationally driven towards the concave wall 722. By being angled toward the concave wall, the inclined surface can preferentially guide the wearable device 650 toward the concave wall 722. In some embodiments, coupling (e.g., attraction) between the AEs (e.g., the AE 716 and the AE 656) can facilitate and/or aid movement of the wearable device 650 toward the support structure 710 and/or concave wall 722. In some embodiments, the concave wall 722 is substantially perpendicular to a surface (e.g., floor, table, etc.) on which the charging device 700 is disposed. In some embodiments, the concave wall 722 is substantially perpendicular to a plane of the wearable device 650 when the wearable device 650 is disposed on the charging device 700.

Figure 10A:
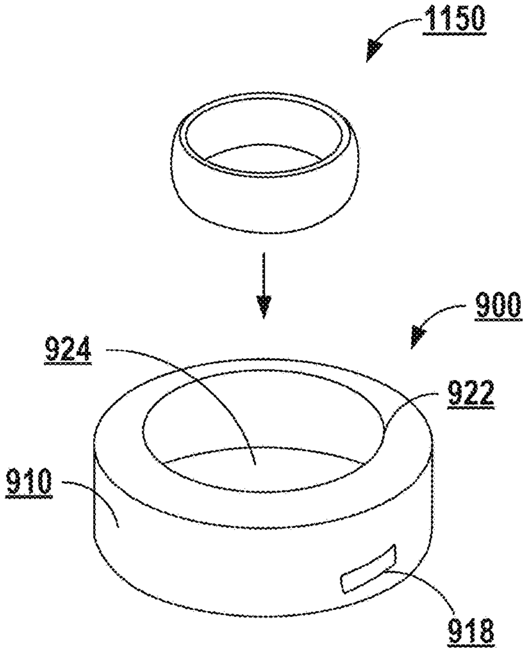
FIG. 10A is a perspective view of an example charging device and an example wearable device, according to an embodiment.
Figure 10B:
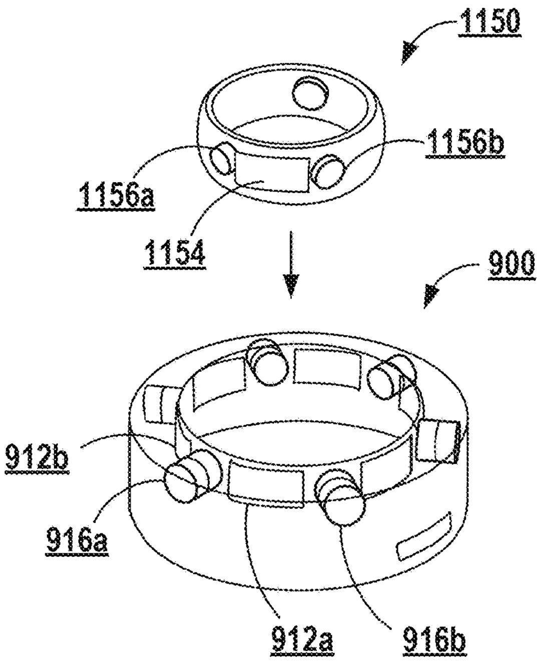
FIG. 10B is a perspective view of the charging device and the wearable device of FIG. 10A showing internal components of the charging device and the wearable device, according to an embodiment.
Figure 10C:
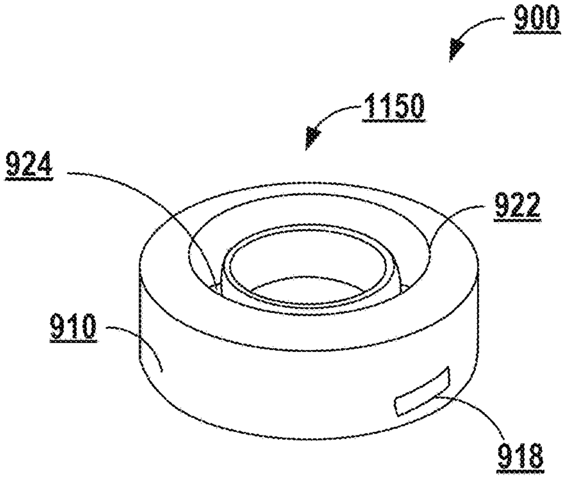
FIG. 10C is a perspective view of the wearable device of FIG. 10A interfacing with the charging device of FIG. 10A, according to an embodiment.
Figure 10D:
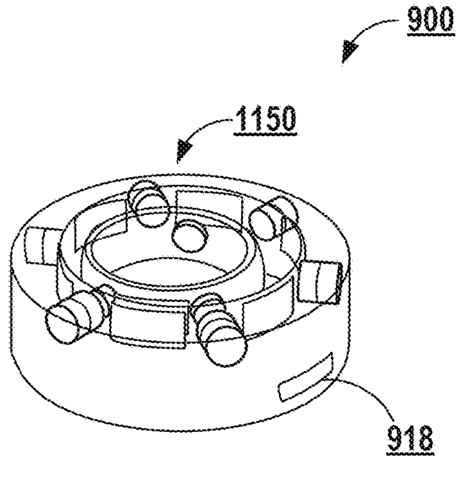
FIG. 10D is a perspective view of the wearable device of FIG. 10A interfacing with the charging device of FIG. 10A showing internal components of the wearable device and the charging device, according to an embodiment.

FIG. 10A is a perspective view of another example charging device 900 and an example wearable device 1150, according to an embodiment. In contrast to other charging devices described herein, the charging device 900 can be configured to fully encircle or surround a perimeter or side of a ring-shaped wearable device. FIG. 10B is a perspective view of the charging device 900 and the wearable device 1150 of FIG. 10A showing internal components of the charging device 900 and the wearable device 1150. FIG. 10C is a perspective view of the wearable device 1150 of FIG. 10A interfacing with the charging device 900 of FIG. 10A. FIG. 10D is a perspective view of the wearable device 1150 of FIG. 10A interfacing with the charging device 900 of FIG. 10A showing internal components of the wearable device 1150 and the charging device 900. The charging device 900 can include components that are structurally and/or functionally similar to other charging devices and/or components thereof described herein, including, for example, the charging device 100 of FIG. 1, the charging device 400 of FIGS. 4A-5C, the charging device 700 of FIGS. 6A-9D, and/or the support structure 210 of FIGS. 2 and 3. For example, the charging device 900 includes a support structure 910 (e.g., structurally and/or functionally similar to the support structure 110 of FIG. 1, the support structure 210 of FIGS. 2 and 3, the support structure 410 of FIGS. 4A-5C, and/or the support structure 710 of FIGS. 6A-9D) and a port 918 (e.g., structurally and/or functionally similar to the port 118 of FIG. 1, the port 418 of FIGS. 4A-5C, and/or the port 718 of FIGS. 6A-6D). The support structure 910 includes an annular wall 922 (e.g., structurally and/or functionally similar to the wall 222 of FIGS. 2 and 3, the curved surface 423 of FIGS. 4A-5C, and/or the wall 722 of FIGS. 6A-9D) and a base 924 (e.g., structurally and/or functionally similar to the base 724 of FIGS. 6A-9D). As best shown in FIGS. 10B and 10D, the support structure 910 includes or otherwise stores TCs 912*a*, 912*b* (e.g., structurally and/or functionally similar to the TC 112 of FIG. 1, the TC 212 of FIGS. 2 and 3, and/or the TCs 712*a*, 712*b* of FIGS. 6A-9D), AEs 916*a*, 916*b* (e.g., structurally and/or functionally similar to the AE 116 of FIG. 1, the AE 216 of FIGS. 2 and 3, and/or the AE 716 of FIGS. 6A-8D). The wearable device 1150 is structurally and/or functionally similar to the wearable device 350 of FIG. 3 and/or the wearable device 650 of FIGS. 5A-9D. As best shown in FIGS. 10B and 10D, the wearable device 1150 includes AEs 1156*a*, 1156*b* (e.g., structurally and/or functionally similar to the AE 356 of FIG. 3 and/or the AE 656 of FIGS. 5A-8D) and an RC 1154 (e.g., structurally and/or functionally similar to the RC 354 of FIG. 3 and/or the RCs 654*a*, 654*b* of FIGS. 5A-9D).

As shown in FIGS. 10B and 10D, the support structure 910 includes six AEs and six TCs and the wearable device 1150 includes three AEs and one RC. The AEs of the support structure 910 are spaced apart along a perimeter of the annular wall 922 and/or the support structure 910. Accordingly, at least one of the AEs (e.g., the AE 916*a*) of the support structure 910 can couple with at least one of the AEs (e.g., the AE 1156*a*) of the wearable device 1150 to align the RC 1154 with at least one of the TCs of the support structure 910. Put differently, the support structure 910 can include a plurality of spaced apart AEs and/or a plurality of spaced apart TCs such that corresponding AEs and RCs of the wearable device 1150 can couple to the closest, neighboring AEs and TCs for efficient charging, regardless of an initial angular position of the wearable device 1150 with respect to the charging device 900.

In some embodiments, the annular wall 922 is an example of a positioning element (e.g., the PE 226, the ends 425*a*, 425*b*, and/or the ends 725*a*, 725*b*, as described above). For example, the annular wall 922 can maintain lateral positioning of the ring-shaped device 1150 or reduce lateral shifting and/or movement of the ring-shaped device 1150 relative to the support structure 910. For example, the AE can align with a corresponding AE in the ring-shaped device, e.g., for subsequent charging. During the alignment, the AE of the charging device 400 can cause the ring-shaped device to rotate (e.g., based on magnetic coupling of the AE of the charging device 400 and the corresponding AE of the ring-shaped device). In such instances, the pointed portions 425*a*, 425*b* and the concave surface 423 can limit or prevent lateral movement (e.g., along a flat surface supporting the support structure 410) of the ring-shaped device as the ring-shaped device rotates to alignment with the support structure 410 (e.g., to alignment with the TC in the support structure 410). In some embodiments, the annular wall 922 can define a space therein that is configured to receive ring-shaped wearable devices having sizes of up to US 16. However, to enable effectively coupling of the AEs of the support structure 910 and the wearable device 1150, the spaced defined by the annular wall 922 can closely correspond to the outer diameter size of the largest wearable device 1150 for which the support structure 910 is designed. For example, the space defined by the annular wall 922 can have a diameter of between about 15 mm to about 25 mm, inclusive of all subranges and values therebetween.

While FIGS. 10A-10D depict the support structure 910 with six AEs and six TCs and the wearable device 1150 with three AEs and one RC, it can be appreciated that any number of AEs and TCs can be included in the support structure 910, and any number of AEs and RCs can be included in the wearable device 1150. The number of AEs and TCs in the support structure 910 (and correspondingly the number of AEs and RCs in the wearable device 1150) can be selected to increase the probability of alignment between the RC of the wearable device and at least one TC of the support structure. Moreover, in some embodiments, lesser or more AEs, TCs, and RCs may be used depending on the size of the support structure 910, the size of the wearable device 1150 being received in the support structure, and/or the size, coupling power, etc. of the AEs, TCs, and RCs.

Figure 11A:
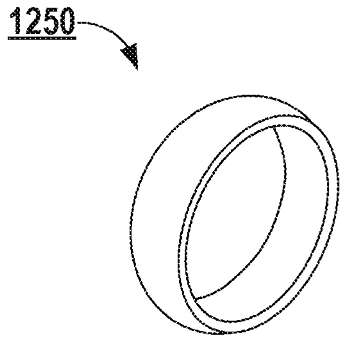
FIG. 11A is a perspective view of another wearable device, according to an embodiment.
Figure 11B:
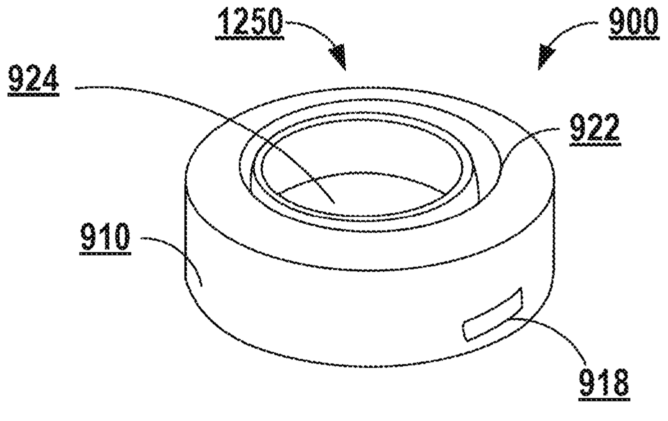
FIG. 11B is a perspective view of the wearable device of FIG. 11A interfacing with the charging device of FIG. 10A, according to an embodiment.

FIG. 11A is a perspective view of another wearable device 1250, according to an embodiment. FIG. 11B is a perspective view of the wearable device 1250 of FIG. 11A interfacing with the charging device 900 of FIG. 10A. The wearable device 1250 of FIGS. 11A and 11B is structurally and/or functionally similar to the wearable device 1150 of FIGS. 10A-10D. However, the wearable device 1250 is a first size (e.g., US12) greater than a size of the wearable device 1150 (e.g., US8). Accordingly, as shown in FIGS. 10A-11B, the charging device 900 is designed for charging wearable devices of different sizes.

Figure 12A:
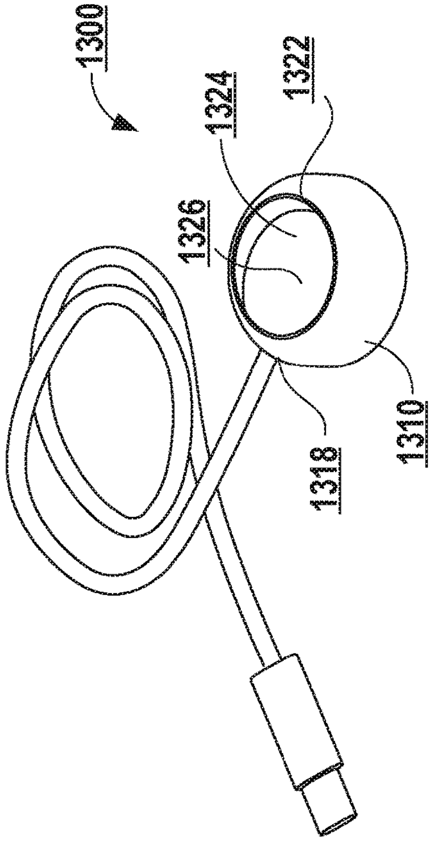
FIG. 12A is a perspective view of an example charging device, according to an embodiment.
Figure 12C:
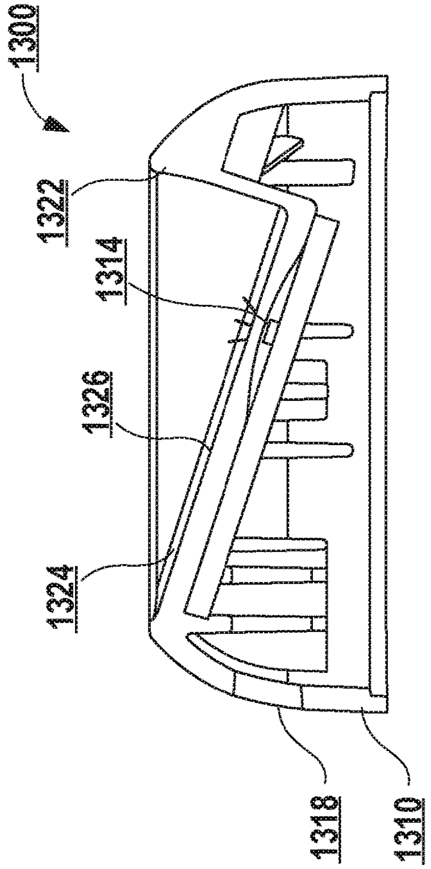
FIG. 12C is a cross-sectional view of the charging device of FIG. 12A, according to an embodiment.
Figure 12B:
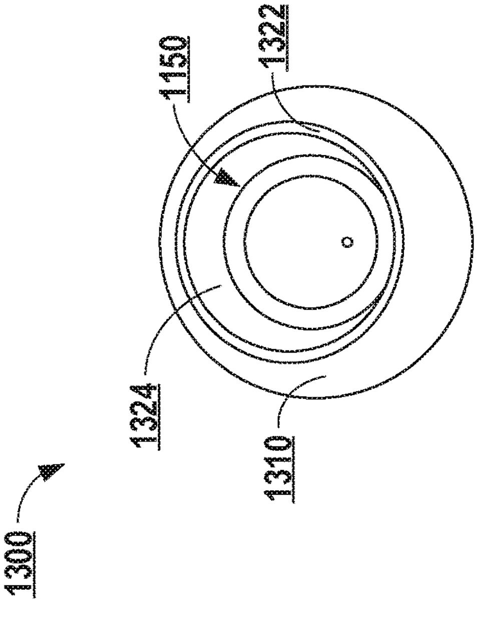
FIG. 12B is a top view of the wearable device of FIG. 10A interfacing with the charging device of FIG. 12A, according to an embodiment.

FIG. 12A is a perspective view of a charging device 1300, according to an embodiment. FIG. 12B is a top view of the wearable device 1150 of FIG. 10A interfacing with the charging device 1300 of FIG. 12A. FIG. 12C is a cross-sectional view of the charging device 1300 of FIG. 12A. The charging device 1300 can include components that are structurally and/or functionally similar to other charging devices and/or components thereof described herein, including, for example, the charging device 100 of FIG. 1, the charging device 400 of FIGS. 4A-5C, the charging device 700 of FIGS. 6A-9D, the charging device 900 of FIGS. 10A-10D and 11B and/or the support structure 210 of FIGS. 2 and 3. For example, the charging device 1300 includes a support structure 1310 (e.g., structurally and/or functionally similar to the support structure 110 of FIG. 1, the support structure 210 of FIGS. 2 and 3, the support structure 410 of FIGS. 4A-5C, the support structure 710 of FIGS. 6A-9D and/or the support structure 900 of FIGS. 10A-10D and 11B) and a port 1318 (e.g., structurally and/or functionally similar to the port 118 of FIG. 1, the port 418 of FIGS. 4A-5C, the port 718 of FIGS. 6A-6D and/or the port 918 of FIGS. 10A-10D and 11B). The support structure 1310 includes an annular wall 1322 (e.g., structurally and/or functionally similar to the wall 222 of FIGS. 2 and 3, the curved surface 423 of FIGS. 4A-5C, the wall 722 of FIGS. 6A-9D and/or the annular wall 922 of FIGS. 10A-10D and 11B), a base 1324 (e.g., structurally and/or functionally similar to the base 724 of FIGS. 6A-9D and/or the base 924 of FIGS. 10A-10D and 11B) having a PE 1326 (e.g., structurally and/or functionally similar to the PE 226 of FIGS. 2 and 3 and/or the PE 726 of FIGS. 6A-9D), and an indicator 1314 (e.g., structurally and/or functionally similar to the indicator 114 of FIG. 1 the indicator 214 of FIGS. 2 and 3 and/or the indicator 714 of FIGS. 6B and 6D). Further, the support structure 1310 can include or otherwise store TCs (not shown) (e.g., structurally and/or functionally similar to the TC 112 of FIG. 1, the TC 212 of FIGS. 2 and 3, the TCs 712*a*, 712*b* of FIGS. 6A-9D and/or the TCs 912*a*, 912*b* of FIGS. 10A-10D and 11B), AEs (not shown) (e.g., structurally and/or functionally similar to the AE 116 of FIG. 1, the AE 216 of FIGS. 2 and 3, AE 716 of FIGS. 6A-8D and/or the AEs 916*a*, 916*b* of FIGS. 10A-10D and 11B). The indicator 1314 can be positioned within the base 1324 and adjacent to the PE 1326. Thus, the indicator 1314 can be visible through the PE 1326.

Figure 13B:
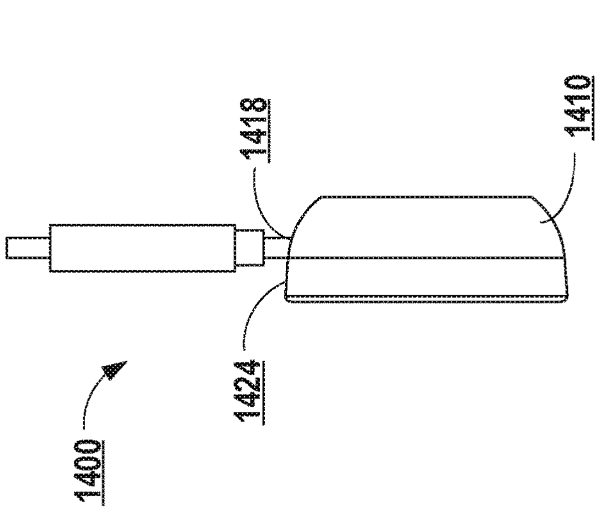
FIG. 13B is a side view of the charging device of FIG. 13A, according to an embodiment.
Figure 13D:
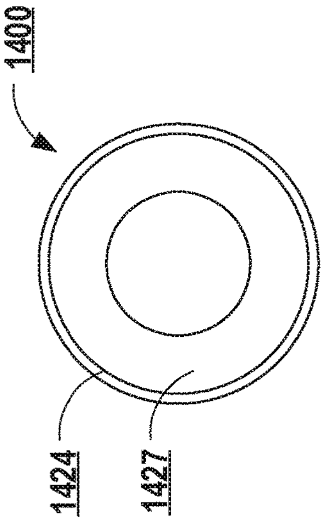
FIG. 13D is a bottom view of the charging device of FIG. 13A, according to an embodiment.
Figure 13A:
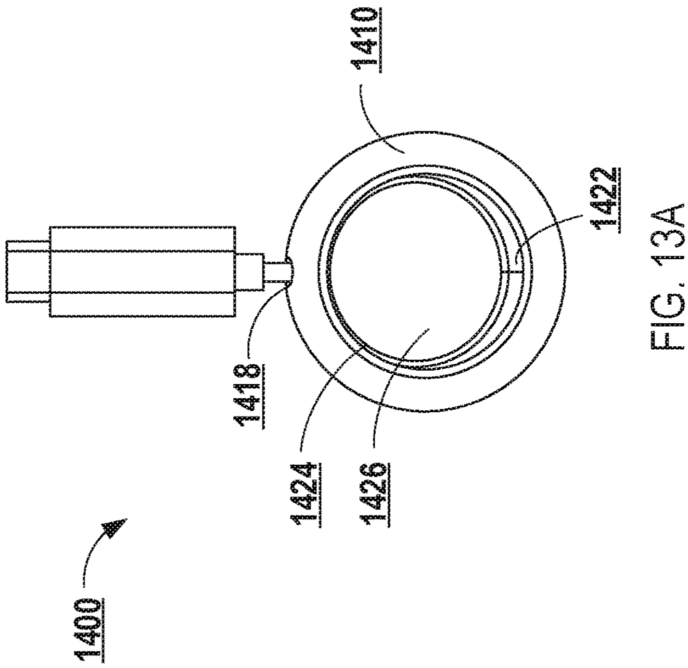
FIG. 13A is a top view of an example charging device, according to an embodiment.
Figure 13C:
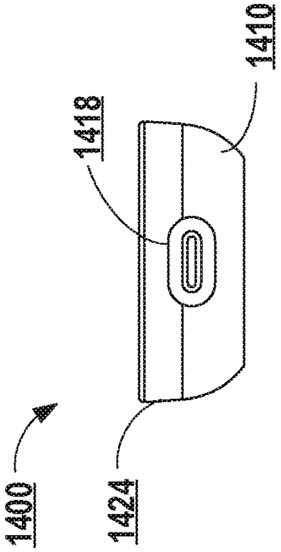
FIG. 13C is another side view of the charging device of FIG. 13A, according to an embodiment.
Figure 13E:
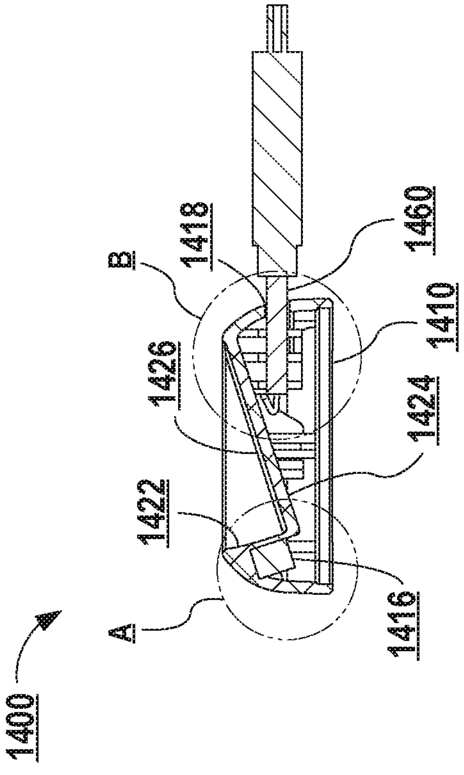
FIG. 13E is a cross-sectional view of the charging device of FIG. 13A, according to an embodiment.
Figure 13F:
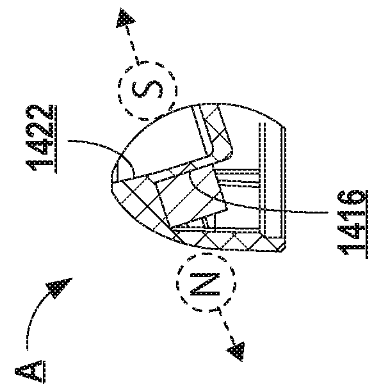
FIG. 13F is a detailed view of the cross-sectional view of FIG. 13E, according to an embodiment.
Figure 13G:
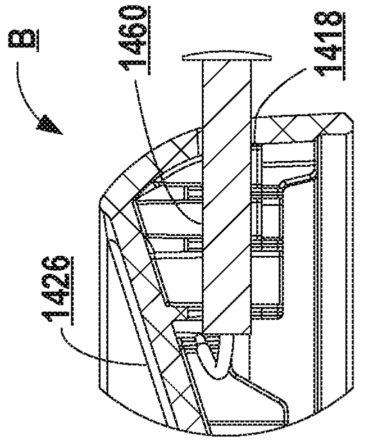
FIG. 13G is another detailed view of the cross-sectional view of FIG. 13E, according to an embodiment.
Figure 13H:
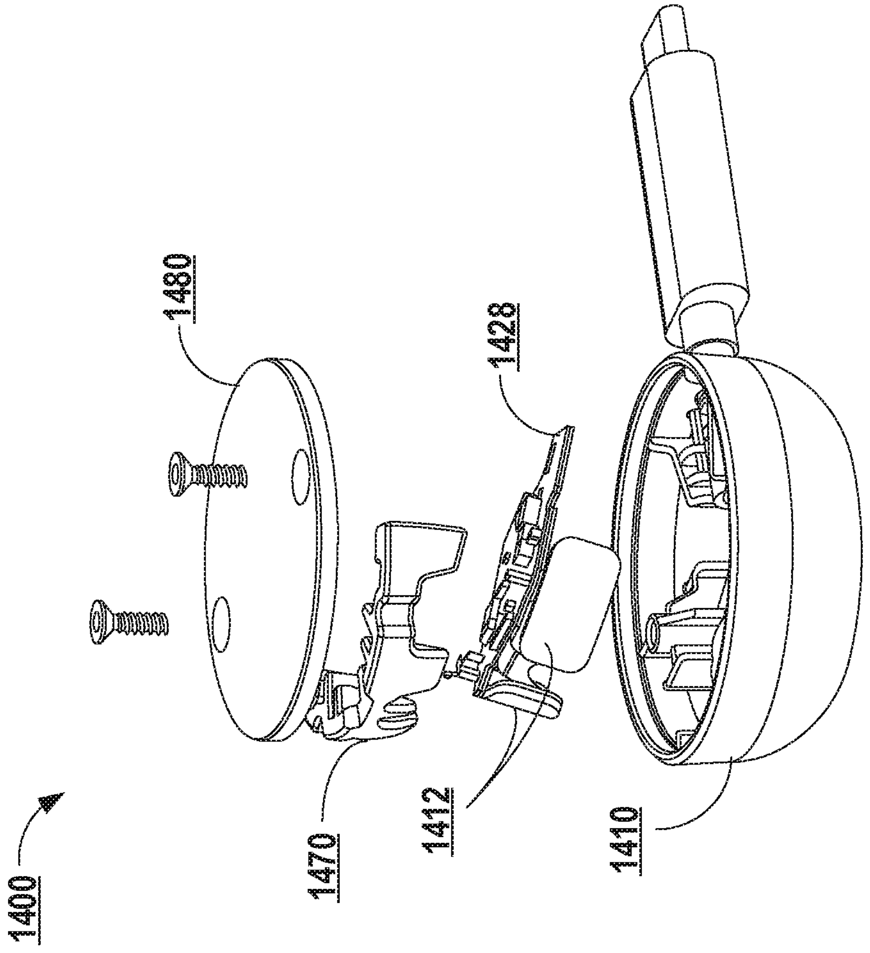
FIG. 13H is an exploded view of the charging device of FIG. 13A, according to an embodiment.

FIG. 13A is a top view of an example charging device 1400, according to an embodiment. FIG. 13B is a side view of the charging device 1400 of FIG. 13A, according to an embodiment. FIG. 13C is another side view of the charging device 1400 of FIG. 13A, according to an embodiment. FIG. 13D is a bottom view of the charging device 1400 of FIG. 13A, according to an embodiment. FIG. 13E is a cross-sectional view of the charging device 1400 of FIG. 13A, according to an embodiment. FIG. 13F is a detailed view (view A) of the cross-sectional view of FIG. 13E, according to an embodiment. FIG. 13G is another detailed view (view B) of the cross-sectional view of FIG. 13E, according to an embodiment. FIG. 13H is an exploded view of the charging device 1400 of FIG. 13A, according to an embodiment.

The charging device 1400 can include components that are structurally and/or functionally similar to other charging devices and/or components thereof described herein, including, for example, the charging device 100 of FIG. 1, the charging device 400 of FIGS. 4A-5C, the charging device 700 of FIGS. 6A-9D, the charging device 900 of FIGS. 10A-10D and 11B, the charging device 1300 of FIGS. 12A-12C, and/or the support structure 210 of FIGS. 2 and 3. For example, the charging device 1400 includes a support structure 1410 (e.g., structurally and/or functionally similar to the support structure 110 of FIG. 1, the support structure 210 of FIGS. 2 and 3, the support structure 410 of FIGS. 4A-5C, the support structure 710 of FIGS. 6A-9D, the support structure 900 of FIGS. 10A-10D and 11B, and/or the support structure 1310 of FIGS. 12A-12C) and a port 1418 (e.g., structurally and/or functionally similar to the port 118 of FIG. 1, the port 418 of FIGS. 4A-5C, the port 718 of FIGS. 6A-6D, the port 918 of FIGS. 10A-10D and 11B, and/or the port 1318 of FIGS. 12A-12C). The support structure 1410 includes an annular wall 1422 (e.g., structurally and/or functionally similar to the wall 222 of FIGS. 2 and 3, the curved surface 423 of FIGS. 4A-5C, the wall 722 of FIGS. 6A-9D, the annular wall 922 of FIGS. 10A-10D and 11B, and/or the annular wall 1322 of FIGS. 12A-12C), a base 1424 (e.g., structurally and/or functionally similar to the base 724 of FIGS. 6A-9D, the base 924 of FIGS. 10A-10D and 11B, and/or the base 1324 of FIGS. 12A-12C) having a PE 1426 (e.g., structurally and/or functionally similar to the PE 226 of FIGS. 2 and 3, the PE 726 of FIGS. 6A-9D, and/or the PE 1326 of FIGS. 12A-12C). Further, the support structure 1410 can include or otherwise store TCs 1412 (e.g., structurally and/or functionally similar to the TC 112 of FIG. 1, the TC 212 of FIGS. 2 and 3, the TCs 712*a*, 712*b* of FIGS. 6A-9D and/or the TCs 912*a*, 912*b* of FIGS. 10A-10D and 11B), an electronic circuit board 1428 (e.g., structurally and/or functionally similar to the electronic circuit board 728 of FIGS. 6B, 6D, and 6F), and an AE 1416 (e.g., structurally and/or functionally similar to the AE 116 of FIG. 1, the AE 216 of FIGS. 2 and 3, AE 716 of FIGS. 6A-8D and/or the AEs 916*a*, 916*b* of FIGS. 10A-10D and 11B).

As shown in FIG. 13D, the base 1424 can include or otherwise couple to a pad 1427 (e.g., an anti-slip pad) that covers at least a portion of the base 1424. As shown in FIGS. 13E and 13G, the charging device 1400 can include a conduit 1460 configured to enable electrical wiring to pass through the port 1418 such that the electrical wiring can facilitate an electrical connection between the charging device 1400 and a power source (not shown). As shown in FIG. 13H, the charging device 1400 can include a support 1470 configured to support, position, stabilize, etc., the TCs 1412. Further, the charging device 1400 can include a plate 1480 configured to cover and/or seal the internal components of the charging device 1400.

In embodiments described herein, the charging devices (and their respective support structures) can come in multiple sizes and/or configurations, e.g., to enable use with different sized wearable devices and/or to enable charging in different environments and/or conditions. In some embodiments, a charging device can have modular components that can be attached and/or detached from one another, e.g., to enable multiple configurations of the charging device. For example, the charging device 200 can have a base and a wall that are attachable and detachable from one another, such that a user can use the wall by itself or together with a base. In some embodiments, a charging device having a first size can be suitable for use with a first range of ring sizes, while a charging device having a second, larger size can be suitable for use with a second range of ring sizes.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

As used in this specification and/or any claims included herein the singular forms "a," "an," and "the" include plural referents unless the context clearly dictates otherwise. Thus, for example, the term "a member" is intended to mean a single member or a combination of members, "a material" is intended to mean one or more materials, and/or the like.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein, the terms "about," "approximately," and/or "substantially" when used in connection with stated value(s) and/or geometric structure(s) or relationship(s) is intended to convey that the value or characteristic so defined is nominally the value stated or characteristic described. In some instances, the terms "about," "approximately," and/or "substantially" can generally mean and/or can generally contemplate a value or characteristic stated within a desirable tolerance, e.g., plus or minus 10% of the value or characteristic stated. For example, a value of about 0.01 can include 0.009 and 0.011, a value of about 0.5 can include 0.45 and 0.55, a value of about 10 can include 9 to 11, and a value of about 1000 can include 900 to 1100. Similarly, a first surface may be described as being substantially parallel to a second surface when the surfaces are nominally parallel. While a value, structure, and/or relationship stated may be desirable, it should be understood that some variance may occur as a result of, for example, manufacturing tolerances or other practical considerations (such as, for example, the pressure or force applied through a portion of a device, conduit, lumen, etc.). Accordingly, the terms "about," "approximately," and/or "substantially" can be used herein to account for such tolerances and/or considerations.

Also, various inventive concepts may be embodied as one or more methods. The acts performed as part of these methods may be ordered in any suitable way. Accordingly, embodiments may be constructed in which acts are performed in an order different than those described, which may include performing some acts simultaneously, even though described as sequential acts in illustrative embodiments.

What is claimed is:

1. An apparatus, comprising:

a housing including a concave wall that is configured to receive and contact an outer side of a ring-shaped device without covering or obscuring an inner side of the ring-shaped device and an upper side of the ring-shaped device such that a hollow center of the ring-shaped device is exposed;

a first inductive charging element disposed in the housing adjacent to the concave wall; and an alignment element disposed in the housing, the alignment element configured to cause a second inductive charging element disposed in the ring-shaped device to align with the first inductive charging element such that the first and second inductive charging elements can charge a power source disposed in the ring-shaped device.

2. The apparatus of claim 1, wherein the alignment element is a first magnet that is configured to magnetically couple with a second magnet disposed in the ring-shaped device to cause the second inductive charging element to align with the first inductive charging element.

3. The apparatus of claim 1, further comprising a wire configured to couple the first inductive charging element to a power source separate from the ring-shaped device.

4. The apparatus of claim 1, wherein the housing is configured to rest on a flat surface adjacent to the ring-shaped device with the concave wall extending substantially upwards from the flat surface.

5. The apparatus of claim 4, wherein a height of the concave wall is equal to or less than a height of the ring-shaped device when the ring-shaped device is resting flat on the surface.

6. The apparatus of claim 1, wherein the alignment element is configured to cause the second inductive charging element to align with the first inductive charging element when at least a portion of the outer side of the ring-shaped device is within a predetermined distance from the concave wall.

7. The apparatus of claim 1, further comprising an indicator configured to indicate when the first and second inductive charging elements are charging the power source.

8. The apparatus of claim 7, wherein the indicator is disposed on the housing on a surface that extends away from the concave wall.

9. The apparatus of claim 1, wherein the housing further comprises an angled surface positioned at an angle relative to the concave wall, the angled surface of the housing configured to position the ring-shaped device relative to the concave wall.

10. The apparatus of claim 9, wherein the concave wall at least partially surrounds the angled surface.

11. An apparatus, comprising:

a housing including a concave wall and a platform that are configured to receive a ring-shaped device without covering an upper side of the ring-shaped device, the concave wall configured to receive and contact an outer side of the ring-shaped device, and the platform coupled to the concave wall, the platform including an inclined surface configured to contact a bottom side of the ring-shaped device and to support the ring-shaped device thereon such that the ring-shaped device is gravitationally driven toward the concave wall;

a first inductive charging element disposed in the concave wall; and an alignment element disposed in the concave wall, the alignment element configured to cause a second inductive charging element disposed in the ring-shaped device to align with the first inductive charging element such that the first and second inductive charging elements can charge a power source disposed in the ring-shaped device.

12. The apparatus of claim 11, wherein the platform is configured to be disposed on a flat surface with the inclined surface being inclined at an angle of between approximately 10 degrees and approximately 30 degrees relative to the flat surface.

13. The apparatus of claim 12, wherein the concave wall extends substantially upwards from the flat surface.

14. The apparatus of claim 12, wherein a height of the concave wall is equal to or less than a height of the ring-shaped device when the ring-shaped device is resting flat on the flat surface.

15. The apparatus of claim 11, further comprising an indicator configured to indicate when the first and second inductive charging elements are charging the power source.

16. The apparatus of claim 15, wherein the indicator is disposed on a middle portion of the inclined surface.

17. The apparatus of claim 11, wherein the concave wall and the platform are configured to support and contact the ring-shaped device along a bottom side and the outer side of the ring-shaped device without covering or obscuring an upper side and an inner side of the ring-shaped device when the ring-shaped device is positioned on the platform against the concave wall.

18. The apparatus of claim 11, wherein the alignment element is a first magnet that is configured to magnetically couple with a second magnet disposed in the ring-shaped device to cause the second inductive charging element to align with the first inductive charging element.

19. The apparatus of claim 18, wherein the first magnet is configured to be magnetically coupled with the second magnet when the ring-shaped device is within a predetermined distance from the concave wall.

20. The apparatus of claim 11, further comprising a wire configured to couple the first inductive charging element to a power source separate from the ring-shaped device.

* * * * *